United States Patent
Yang et al.

(10) Patent No.: US 12,489,779 B2
(45) Date of Patent: Dec. 2, 2025

(54) MISBEHAVIOR PROCESSING IN CONNECTED VEHICLE NETWORKS

(71) Applicant: Intel Corporation, Santa Clara, CA (US)

(72) Inventors: Liuyang Lily Yang, Portland, OR (US); Manoj R. Sastry, Portland, OR (US); Kathiravetpillai Sivanesan, Portland, OR (US); Marcio Rogerio Juliato, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 17/482,864

(22) Filed: Sep. 23, 2021

(65) Prior Publication Data

US 2022/0014549 A1    Jan. 13, 2022

(51) Int. Cl.
*H04L 9/40* (2022.01)
*H04L 9/32* (2006.01)
*H04W 4/40* (2018.01)

(52) U.S. Cl.
CPC ........ *H04L 63/1441* (2013.01); *H04L 9/3268* (2013.01); *H04L 63/04* (2013.01); *H04W 4/40* (2018.02); *H04L 2209/84* (2013.01)

(58) Field of Classification Search
CPC ........... H04W 4/40; H04W 4/44; H04W 4/46; H04W 12/122; H04W 12/069; H04L 63/1441; H04L 63/1425; H04L 63/04; H04L 63/0823; H04L 9/3268; H04L 2209/84

See application file for complete search history.

(56) References Cited

U.S. PATENT DOCUMENTS

| | | | |
|---|---|---|---|
| 2003/0130960 A1* | 7/2003 | Fraser | H04L 63/10 705/76 |
| 2010/0191973 A1* | 7/2010 | Huntzicker | H04W 12/069 713/176 |
| 2019/0116048 A1* | 4/2019 | Chen | H04L 9/0819 |
| 2019/0245705 A1* | 8/2019 | Kumar | H04L 63/065 |
| 2019/0322367 A1* | 10/2019 | El Idrissi | G08G 1/096822 |

(Continued)

OTHER PUBLICATIONS

"European Application Serial No. 22191795.8, Extended European Search Report mailed Jan. 16, 2023", 9 pgs.

(Continued)

*Primary Examiner* — Jeremy S Duffield
(74) *Attorney, Agent, or Firm* — Schwegman Lundberg & Woessner, P.A.

(57) ABSTRACT

Systems and techniques for misbehavior processing in connected vehicle networks such as a vehicle-to-everything (V2X) communication environment are described herein. A misbehavior report may be received by a local misbehavior agent from a node operating on a vehicle communication network. The local misbehavior agent may be responsible for a geographic area in which the node is located. The misbehavior report may be corroborated using the misbehavior report and evidence of misbehavior of a subject node of the misbehavior report. A revocation recommendation may be generated for the subject node based on the corroboration. The revocation recommendation may be transmitted to a misbehavior authority operating on the vehicle communication network.

19 Claims, 9 Drawing Sheets

(56) References Cited

U.S. PATENT DOCUMENTS

2020/0228948 A1* 7/2020 Watfa .................... H04W 48/16
2020/0280842 A1* 9/2020 Liu ....................... H04L 9/3268
2020/0351616 A1* 11/2020 Vanderveen .......... H04W 12/03
2021/0344513 A1* 11/2021 Russell .................. H04W 4/40

OTHER PUBLICATIONS

Ghassan, Samara, "A new security mechanism for vehicular communication networks", Cyber Security, Cyber Warfare and Digital Forensic (Cybersec), 2012 International Conference ON, IEEE, (Jun. 26, 2012).

"European Application Serial No. 22191795.8, Response filed Sep. 5, 2023 to Extended European Search Report mailed Jan. 16, 2023", 26 pgs.

"European Application Serial No. 22191795.8, Communication Pursuant to Article 94(3) EPC mailed Jan. 16, 2024", 8 pgs.

"European Application Serial No. 22191795.8, Response filed May 2, 2024 to Communication Pursuant to Article 94(3) EPC mailed Jan. 16, 2024", 11 pgs.

"European Application Serial No. 22191795.8, Communication Pursuant to Article 94(3) EPC mailed Dec. 11, 2024", 6 pgs.

"European Application Serial No. 22191795.8, Response filed Mar. 31, 2025 to Communication Pursuant to Article 94(3) EPC mailed Dec. 11, 2024", 11 pgs.

* cited by examiner

MISBEHAVIOR PROCESSING IN CONNECTED VEHICLE NETWORKS

TECHNICAL FIELD

Embodiments described herein generally relate to connected vehicle communication networks and, in some embodiments, more specifically to misbehavior reporting and processing in connected vehicle networks.

BACKGROUND

Vehicle-to-everything (V2X) deployments enable information sharing between vehicles, pedestrians, and Road Side Units (RSUs) in proximity through V2X messages. Authenticity and integrity of messages exchanged over V2X is guaranteed by digital signatures. However, an adversary may compromise an on board unit (OBU) of a vehicle or steal credentials from a legitimate vehicle to craft and distribute V2X messages containing fake information. V2X Misbehavior, defined as the willful or inadvertent transmission of incorrect data within the V2X network, may be caused by malfunctioning components or malicious attacks. Such incorrect data, when transmitted with valid security credentials such as verifiable digital signatures, may cause the receiving vehicle to make wrong or unsafe decisions on the road. This is a threat that must be addressed properly before V2X can be safely mass-deployed. Consequently, in many existing deployments, V2X receiving nodes, including vehicles and RSUs, may or may not attempt their own type of misbehavior detection to verify the correctness of the incoming V2X messages before the information in the messages is used.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
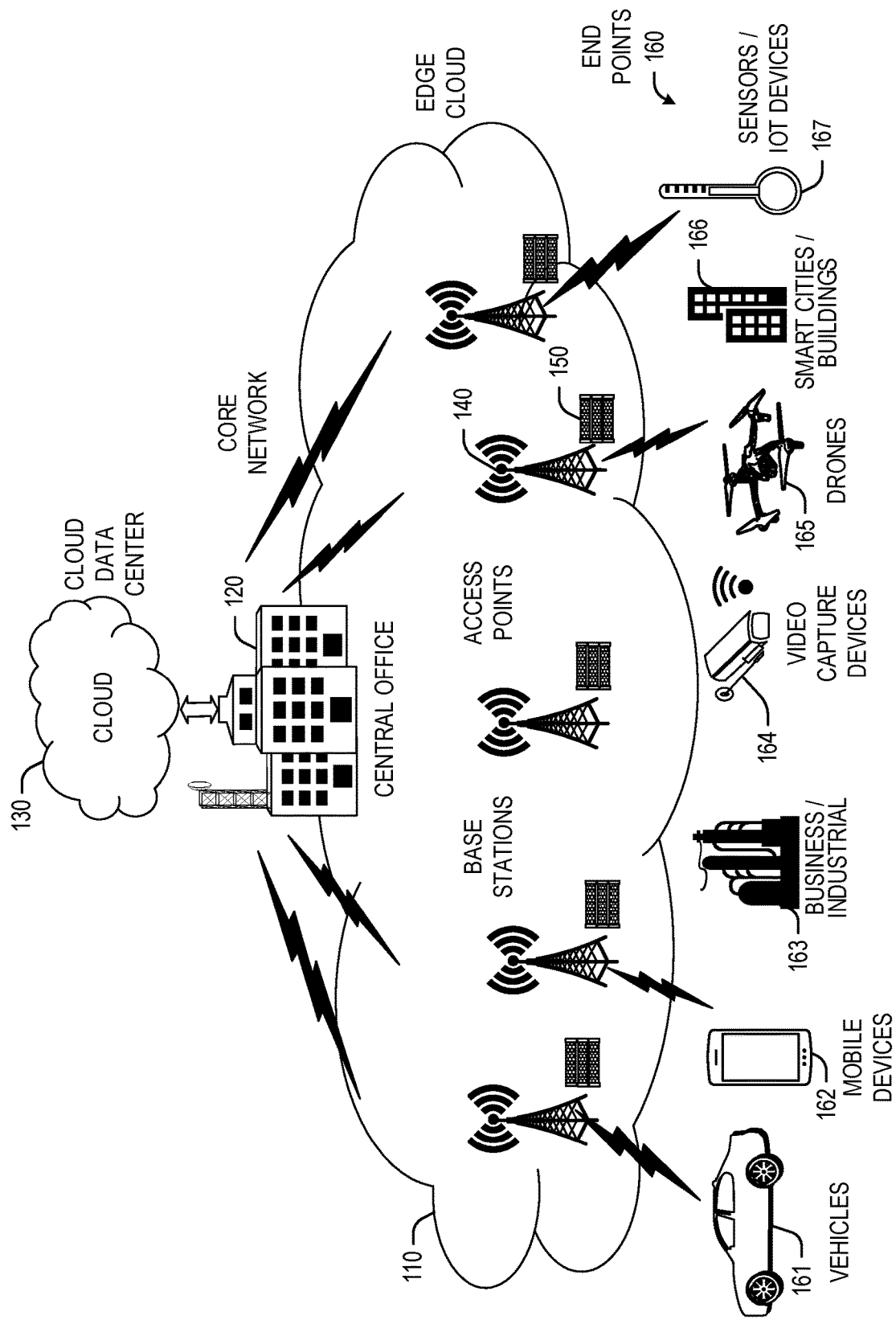
FIG. 1 illustrates an overview of an edge cloud configuration for edge computing.

Conventional misbehavior detection and reporting V2X systems may use a V2X receiver to detect that received V2X messages are suspect and potentially misbehaving. As used herein, misbehavior refers to a V2X node that is transmitting incorrect data. The incorrect data may be corrupted, falsified, or otherwise adulterated and may risk incorrect operation of V2X nodes or components of the vehicle communication network. Risks of incorrect data may include collisions, near miss events, misconfigurations, and the like. The V2X receiver reports the misbehaving messages and their transmitters to a central entity called a Misbehavior Authority (MA) in the backend of a Public Key Infrastructure (PM) such as a Security Credential Management System (SCMS) in the United States (US). The exact business and operational models to stand up and deploy PKI for connected vehicles are under development around the world. For example, SCMS is expected to be deployed in the US by a consortium of private and public stakeholders including vehicle manufacturers and government agencies. It is possible that a single SCMS may be deployed to administer the entire population of connected cars in the US. By default, the Misbehavior Authority is a centralized logical entity in the PM such as SCMS to handle the misbehavior reports from cars in the system. In an example architecture, the MA may be implemented by a cluster of physical computing nodes to fulfill the responsibility of MA collectively. In the example architecture, the cluster is centralized under a single administrative domain.

There are several potential challenges with this example architecture. First, the MA may become a bottleneck because it will handle all the misbehavior reports transmitted by the millions of vehicles on the road that is administered under the PM—this could be as big as a country or state—or cars from a single manufacturer depending on how PM is set up in practice. The potential for the centralized MA becoming a bottleneck is realized even if at any given time a small percentage of cars maybe suspected of misbehaving and be reported to the MA. For instance, if 0.01% of cars are suspicious, that translates to one hundred cars being reported per million connected cars. For the MA to investigate these reports effectively, it needs to corroborate reports from different observers on the same misbehavior so that it does not depend only on a single report to conclude that a misbehaving transmitter warrants penalization of being revoked from the system (e.g., by revoking digital certificates, etc.). The corroboration takes time, especially when the MA is processing a high volume of misbehavior reports. It may take days from the time misbehavior report is received to the time the revocation decision is made. This lag in time for corroboration leads to a secondary challenge of a long delay between report and resolution or any remedial action leaving the misbehaving transmitter free to transmit potentially harmful data. Also, the MA may be physically far away from where the misbehaving vehicles are and does not have any other additional insight into the misbehavior to help investigate if the report is valid. Thus, a third challenge arises if there are not enough independent reports received to corroborate the evidence of misbehavior to make a revocation decision.

The systems and techniques discussed herein address the challenges with conventional V2X misbehavior reporting and processing with a distributed architecture. This distributed architecture may be configure to handle misbehavior reports by adding a Local MA Agent (LMA) that acts as an intermediary between the vehicle and a back-end MA. An LMA is responsible for processing misbehavior reports from a local region at the edge of the connected vehicle communication network. A federation of LMAs across the US, for example, becomes an edge extension of the centralized MA and is collectively responsible for processing and resolving misbehavior reports from vehicles.

With this approach, the MA becomes a distributed and federated network of LMAs that may exchange data directly or through a centralized MA head. There are several benefits of such a distributed LMA-MA architecture. More scalable processing is enabled for incoming misbehavior reports from vehicles. The LMA may not only correlate reports from different reporters against each other but may also leverage local resources in the infrastructure to help gather additional information and/or evidence to assist its investigation into these reports. This decouples the deployment of the centralize MA from the LMAs at the edge. LMAs may be deployed incrementally at locations where sufficient penetration rate is achieved for connected cars to make the deployment economically feasible. This also preserves vehicle privacy because the data contained in the misbehavior reports stays locally at the edge instead of being centralized in a MA in the backend of the connected vehicle communication network.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
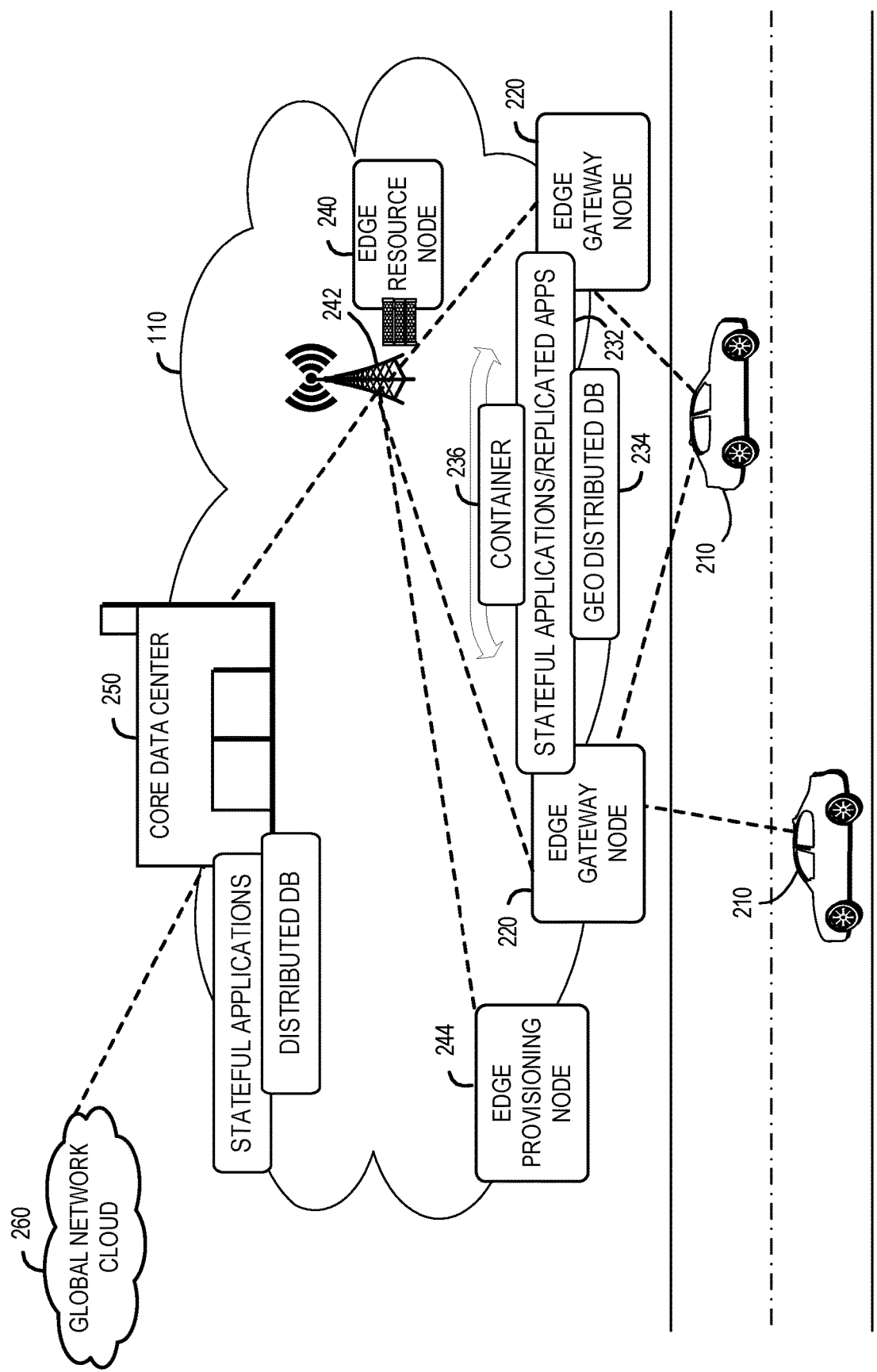
FIG. 2 illustrates a compute and communication use case involving mobile access to applications in an edge computing system.

FIG. 2 shows a simplified vehicle compute and communication use case involving mobile access to applications in an edge computing system 200 that implements an edge cloud 110. In this use case, respective client compute nodes 210 may be embodied as in-vehicle compute systems (e.g., in-vehicle navigation and/or infotainment systems) located in corresponding vehicles which communicate with the edge gateway nodes 220 during traversal of a roadway. For instance, the edge gateway nodes 220 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 210 and a particular edge gateway device 220 may propagate so as to maintain a consistent connection and context for the client compute node 210. Likewise, mobile edge nodes may aggregate at the high priority services or according to the throughput or latency resolution requirements for the underlying service(s) (e.g., in the case of drones). The respective edge gateway devices 220 include an amount of processing and storage capabilities and, as such, some processing and/or storage of data for the client compute nodes 210 may be performed on one or more of the edge gateway devices 220.

The edge gateway devices 220 may communicate with one or more edge resource nodes 240, which are illustratively embodied as compute servers, appliances or components located at or in a communication base station 242 (e.g., a based station of a cellular network). As discussed above, the respective edge resource nodes 240 include an amount of processing and storage capabilities and, as such, some processing and/or storage of data for the client compute nodes 210 may be performed on the edge resource node 240. For example, the processing of data that is less urgent or important may be performed by the edge resource node 240, while the processing of data that is of a higher urgency or importance may be performed by the edge gateway devices 220 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 240 also communicate with the core data center 250, which may include compute servers, appliances, and/or other components located in a central location (e.g., a central office of a cellular communication network). The core data center 250 may provide a gateway to the global network cloud 260 (e.g., the Internet) for the edge cloud 110 operations formed by the edge resource node(s) 240 and the edge gateway devices 220. Additionally, in some examples, the core data center 250 may include an amount of processing and storage capabilities and, as such, some processing and/or storage of data for the client compute devices may be performed on the core data center 250 (e.g., processing of low urgency or importance, or high complexity).

The edge gateway nodes 220 or the edge resource nodes 240 may offer the use of stateful applications 232 and a geographic distributed database 234. Although the applications 232 and database 234 are illustrated as being horizontally distributed at a layer of the edge cloud 110, it will be understood that resources, services, or other components of the application may be vertically distributed throughout the edge cloud (including, part of the application executed at the client compute node 210, other parts at the edge gateway nodes 220 or the edge resource nodes 240, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 236 (or pod of containers) may be flexibly migrated from an edge node 220 to other edge nodes (e.g., 220, 640, etc.) such that the container with an application and workload does not need to be reconstituted, re-compiled, re-interpreted in order for migration to work. However, in such settings, there may be some remedial or "swizzling" translation operations applied. For example, the physical hardware at node 240 may differ from edge gateway node 220 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 2 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 220, some others at the edge resource node 240, and others in the core data center 250 or global network cloud 260.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 200 can include or be in communication with an edge provisioning node 244. The edge provisioning node 244 can distribute software such as the example computer readable instructions 382 of FIG. 3B, to various receiving parties for implementing any of the methods described herein. The example edge provisioning node 244 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 244 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 244. For example, the entity that owns and/or operates the edge provisioning node 244 may be a developer, a seller, and/or a licensor (or a customer and/or consumer thereof) of software instructions such as the example computer readable instructions 382 of FIG. 3B. The receiving parties may be consumers, service providers, users, retailers, OEMs, etc., who purchase and/or license the software instructions for use and/or re-sale and/or sub-licensing.

In an example, edge provisioning node 244 includes one or more servers and one or more storage devices. The storage devices host computer readable instructions such as the example computer readable instructions 382 of FIG. 3B, as described below. Similarly to edge gateway devices 220 described above, the one or more servers of the edge provisioning node 244 are in communication with a base station 242 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 382 from the edge provisioning node 244. For example, the software instructions, which may correspond to the example computer readable instructions 382 of FIG. 3B, may be downloaded to the example processor platform/s, which is to execute the computer readable instructions 382 to implement the methods described herein.

In some examples, the processor platform(s) that execute the computer readable instructions 382 can be physically located in different geographic locations, legal jurisdictions, etc. In some examples, one or more servers of the edge provisioning node 244 periodically offer, transmit, and/or force updates to the software instructions (e.g., the example computer readable instructions 382 of FIG. 3B) to ensure improvements, patches, updates, etc. are distributed and applied to the software instructions implemented at the end user devices. In some examples, different components of the computer readable instructions 382 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 3A and 3B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 3A:
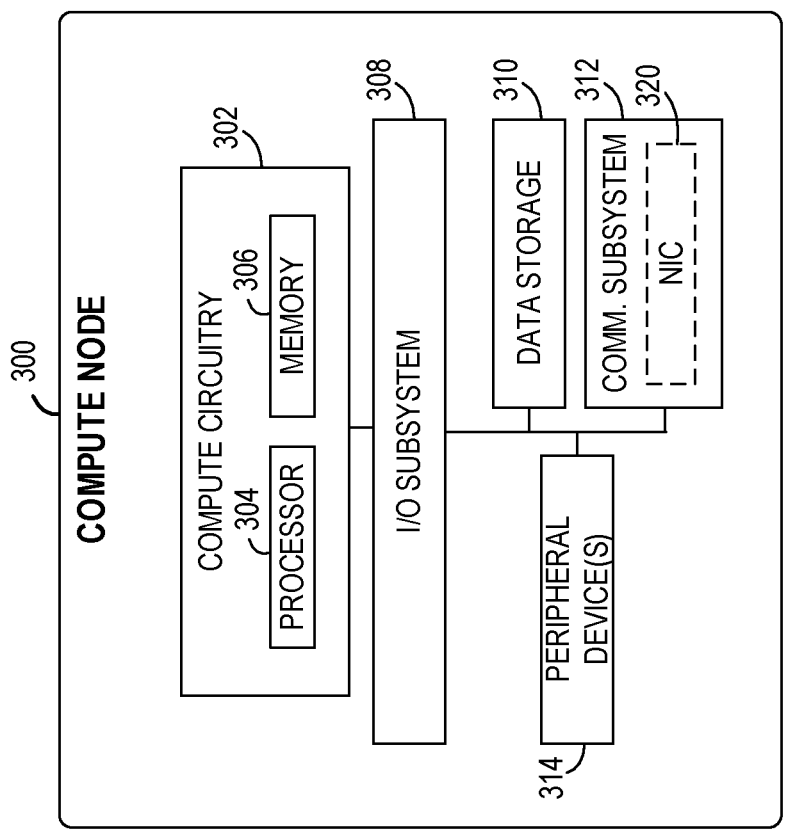
FIG. 3A provides an overview of example components for compute deployed at a compute node in an edge computing system.

In the simplified example depicted in FIG. 3A, an edge compute node 300 includes a compute engine (also referred to herein as "compute circuitry") 302, an input/output (I/O) subsystem 308, data storage 310, a communication circuitry subsystem 312, and, optionally, one or more peripheral devices 314. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 300 may be embodied as any type of engine, device, or collection of devices capable of performing various compute functions. In some examples, the compute node 300 may be embodied as a single device such as an integrated circuit, an embedded system, a field-programmable gate array (FPGA), a system-on-a-chip (SOC), or other integrated system or device. In the illustrative example, the compute node 300 includes or is embodied as a processor 304 and a memory 306. The processor 304 may be embodied as any type of processor capable of performing the functions described herein (e.g., executing an application). For example, the processor 304 may be embodied as a multi-core processor(s), a microcontroller, a processing unit, a specialized or special purpose processing unit, or other processor or processing/controlling circuit.

In some examples, the processor 304 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 304 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 304 may work in coordination with each other to execute many types of operations and instructions within and on behalf of the compute node 300.

The memory 306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 306 may be integrated into the processor 304. The memory 306 may store various software and data used during operation such as one or more applications, data operated on by the application(s), libraries, and drivers.

The compute circuitry 302 is communicatively coupled to other components of the compute node 300 via the I/O subsystem 308, which may be embodied as circuitry and/or components to facilitate input/output operations with the compute circuitry 302 (e.g., with the processor 304 and/or the main memory 306) and other components of the compute circuitry 302. For example, the I/O subsystem 308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 308 may form a portion of a system-on-a-chip (SoC) and be incorporated, along with one or more of the processor 304, the memory 306, and other components of the compute circuitry 302, into the compute circuitry 302.

The one or more illustrative data storage devices 310 may be embodied as any type of devices configured for short-term or long-term storage of data such as, for example, memory devices and circuits, memory cards, hard disk drives, solid-state drives, or other data storage devices. Individual data storage devices 310 may include a system partition that stores data and firmware code for the data storage device 310. Individual data storage devices 310 may also include one or more operating system partitions that store data files and executables for operating systems depending on, for example, the type of compute node 300.

The communication circuitry 312 may be embodied as any communication circuit, device, or collection thereof, capable of enabling communications over a network between the compute circuitry 302 and another compute device (e.g., an edge gateway of an implementing edge computing system). The communication circuitry 312 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 312 includes a network interface controller (MC) 320, which may also be referred to as a host fabric interface (HFI). The NIC 320 may be embodied as one or more add-in-boards, daughter cards, network interface cards, controller chips, chipsets, or other devices that may be used by the compute node 300 to connect with another compute device (e.g., an edge gateway node). In some examples, the NIC 320 may be embodied as part of a system-on-a-chip (SoC) that includes one or more processors, or included on a multichip package that also contains one or more processors. In some examples, the MC 320 may include a local processor (not shown) and/or a local memory (not shown) that are both local to the NIC 320. In such examples, the local processor of the MC 320 may be capable of performing one or more of the functions of the compute circuitry 302 described herein. Additionally, or alternatively, in such examples, the local memory of the MC 320 may be integrated into one or more components of the client compute node at the board level, socket level, chip level, and/or other levels.

Additionally, in some examples, a respective compute node 300 may include one or more peripheral devices 314. Such peripheral devices 314 may include any type of peripheral device found in a compute device or server such as audio input devices, a display, other input/output devices, interface devices, and/or other peripheral devices, depending on the particular type of the compute node 300. In further examples, the compute node 300 may be embodied by a respective edge compute node (whether a client, gateway, or aggregation node) in an edge computing system or like forms of appliances, computers, subsystems, circuitry, or other components.

Figure 3B:
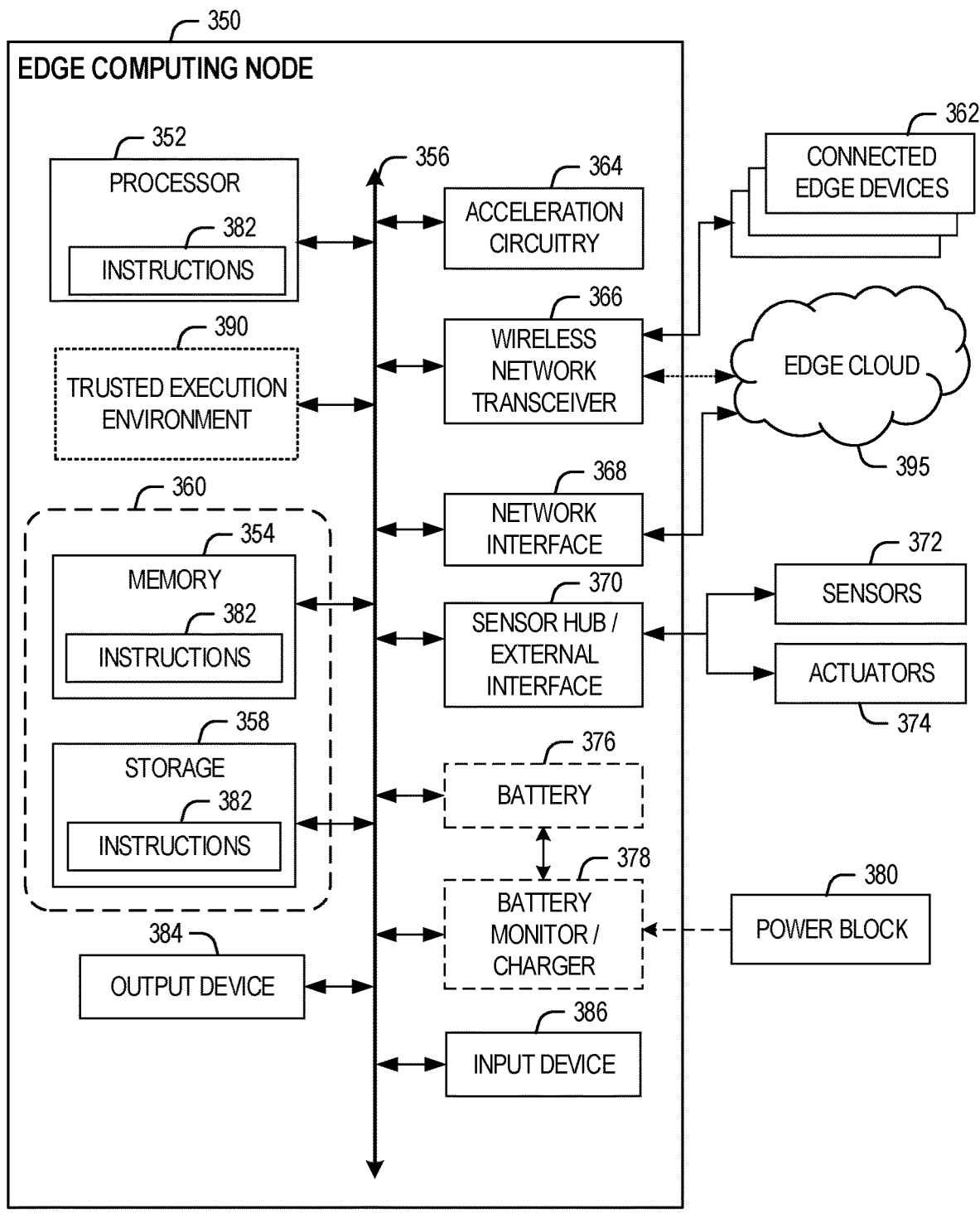
FIG. 3B provides a further overview of example components within a computing device in an edge computing system.

In a more detailed example, FIG. 3B illustrates a block diagram of an example of components that may be present in an edge computing node 350 for implementing the techniques (e.g., operations, processes, methods, and methodologies) described herein. This edge computing node 350 provides a closer view of the respective components of node 300 when implemented as or as part of a computing device (e.g., as a mobile device, a base station, server, gateway, etc.). The edge computing node 350 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 350, or as components otherwise incorporated within a chassis of a larger system.

The edge computing device 350 may include processing circuitry in the form of a processor 352, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 352 may be a part of a system on a chip (SoC) in which the processor 352 and other components are formed into a single integrated circuit, or a single package, such as the Edison™ or Galileo™ SoC boards from Intel Corporation, Santa Clara, California. As an example, the processor 352 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 352 and accompanying circuitry may be provided in a single socket form factor, multiple socket form factor, or a variety of other formats, including in limited hardware configurations or configurations that include fewer than all elements shown in FIG. 3B.

The processor 352 may communicate with a system memory 354 over an interconnect 356 (e.g., a bus). Any number of memory devices may be used to provide for a given amount of system memory. As examples, the memory 354 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 358 may also couple to the processor 352 via the interconnect 356. In an example, the storage 358 may be implemented via a solid-state disk drive (SSDD). Other devices that may be used for the storage 358 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 358 may be on-die memory or registers associated with the processor 352. However, in some examples, the storage 358 may be implemented using a micro hard disk drive (HDD). Further, any number of new technologies may be used for the storage 358 in addition to, or instead of, the technologies described, such resistance change memories, phase change memories, holographic memories, or chemical memories, among others.

The components may communicate over the interconnect 356. The interconnect 356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 356 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 356 may couple the processor 352 to a transceiver 366, for communications with the connected edge devices 362. The transceiver 366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 366 (or multiple transceivers) may communicate using multiple standards or radios for communications at a different range. For example, the edge computing node 350 may communicate with close devices, e.g., within about 10 meters, using a local transceiver based on Bluetooth Low Energy (BLE), or another low power radio, to save power. More distant connected edge devices 362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 366 (e.g., a radio transceiver) may be included to communicate with devices or services in the edge cloud 395 via local or wide area network protocols. The wireless network transceiver 366 may be a low-power wide-area (LPWA) transceiver that follows the IEEE 802.15.4, or IEEE 802.15.4g standards, among others. The edge computing node 350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 366, as described herein. For example, the transceiver 366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (MC) 368 may be included to provide a wired communication to nodes of the edge cloud 395 or to other devices, such as the connected edge devices 362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional MC 368 may be included to enable connecting to a second network, for example, a first MC 368 providing communications to the cloud over Ethernet, and a second NIC 368 providing communications to other devices over another type of network.

Given the variety of types of applicable communications from the device to another component or network, applicable communications circuitry used by the device may include or be embodied by any one or more of components 364, 366, 368, or 370. Accordingly, in various examples, applicable means for communicating (e.g., receiving, transmitting, etc.) may be embodied by such communications circuitry.

The edge computing node 350 may include or be coupled to acceleration circuitry 364, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 356 may couple the processor 352 to a sensor hub or external interface 370 that is used to connect additional devices or subsystems. The devices may include sensors 372, such as accelerometers, level sensors, flow sensors, optical light sensors, camera sensors, temperature sensors, global navigation system (e.g., GPS) sensors, pressure sensors, barometric pressure sensors, and the like. The hub or interface 370 further may be used to connect the edge computing node 350 to actuators 374, such as power switches, valve actuators, an audible sound generator, a visual warning device, and the like.

In some optional examples, various input/output (I/O) devices may be present within or connected to, the edge computing node 350. For example, a display or other output device 384 may be included to show information, such as sensor readings or actuator position. An input device 386, such as a touch screen or keypad may be included to accept input. An output device 384 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 350. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 376 may power the edge computing node 350, although, in examples in which the edge computing node 350 is mounted in a fixed location, it may have a power supply coupled to an electrical grid, or the battery may be used as a backup or for temporary capabilities. The battery 376 may be a lithium ion battery, or a metal-air battery, such as a zinc-air battery, an aluminum-air battery, a lithium-air battery, and the like.

A battery monitor/charger 378 may be included in the edge computing node 350 to track the state of charge (SoCh) of the battery 376, if included. The battery monitor/charger 378 may be used to monitor other parameters of the battery 376 to provide failure predictions, such as the state of health (SoH) and the state of function (SoF) of the battery 376. The battery monitor/charger 378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 378 may communicate the information on the battery 376 to the processor 352 over the interconnect 356. The battery monitor/charger 378 may also include an analog-to-digital (ADC) converter that enables the processor 352 to directly monitor the voltage of the battery 376 or the current flow from the battery 376. The battery parameters may be used to determine actions that the edge computing node 350 may perform, such as transmission frequency, mesh network operation, sensing frequency, and the like.

A power block 380, or other power supply coupled to a grid, may be coupled with the battery monitor/charger 378 to charge the battery 376. In some examples, the power block 380 may be replaced with a wireless power receiver to obtain the power wirelessly, for example, through a loop antenna in the edge computing node 350. A wireless battery charging circuit, such as an LTC4020 chip from Linear Technologies of Milpitas, California, among others, may be included in the battery monitor/charger 378. The specific charging circuits may be selected based on the size of the battery 376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 358 may include instructions 382 in the form of software, firmware, or hardware commands to implement the techniques described herein. Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine-readable medium 360 including code to direct the processor 352 to perform electronic operations in the edge computing node 350. The processor 352 may access the non-transitory, machine-readable medium 360 over the interconnect 356. For instance, the non-transitory, machine-readable medium 360 may be embodied by devices described for the storage 358 or may include specific storage units such as optical disks, flash drives, or any number of other hardware devices. The non-transitory, machine-readable medium 360 may include instructions to direct the processor 352 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 382 on the processor 352 (separately, or in combination with the instructions 382 of the machine readable medium 360) may configure execution or operation of a trusted execution environment (TEE) 390. In an example, the TEE 390 operates as a protected area accessible to the processor 352 for secure execution of instructions and secure access to data. Various implementations of the TEE 390, and an accompanying secure area in the processor 352 or the memory 354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 350 through the TEE 390 and the processor 352.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 4:
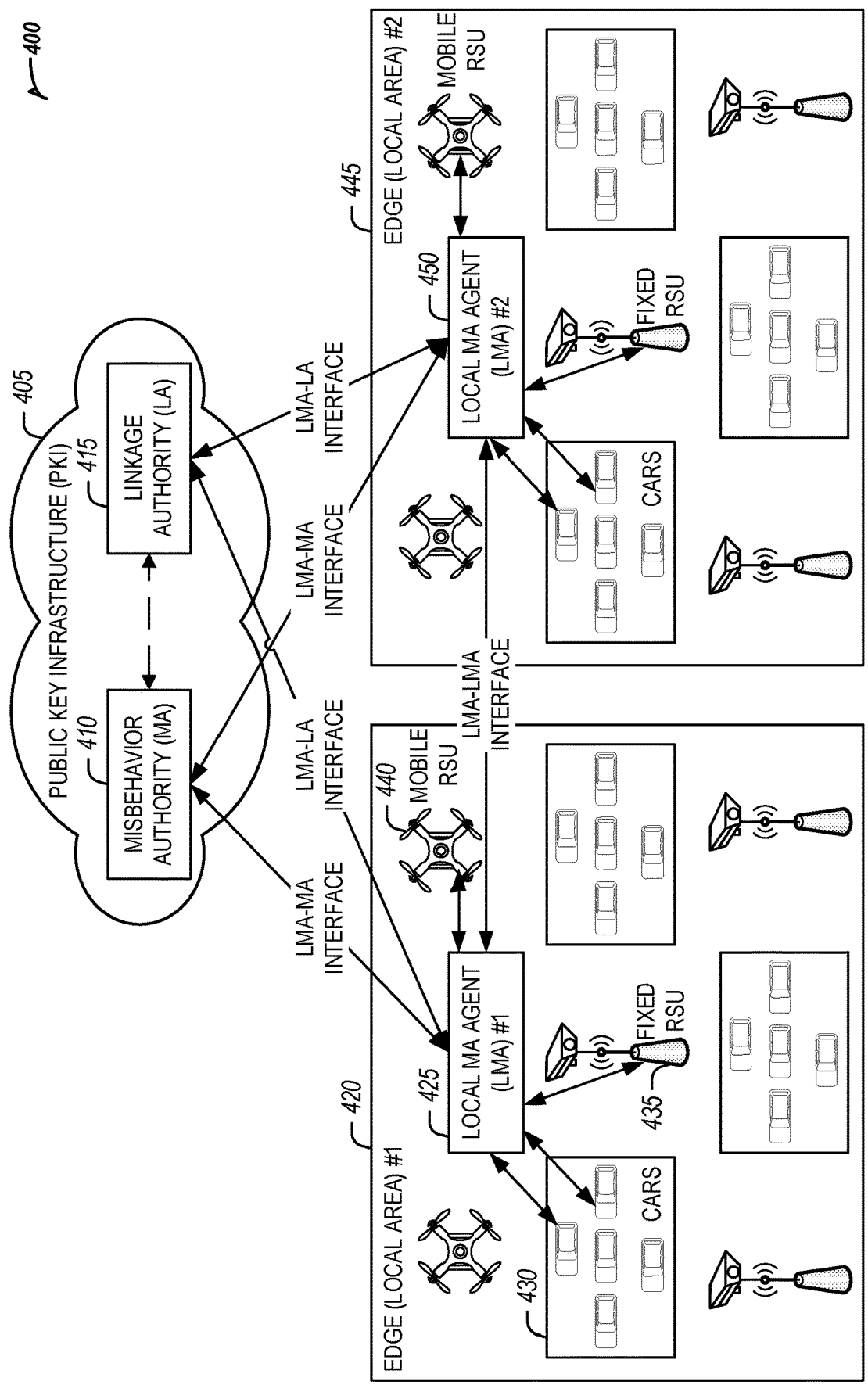
FIG. 4 is a block diagram of an example of a system for misbehavior processing in connected vehicle networks, according to an embodiment.

FIG. 4 is a block diagram of an example of a system 400 for misbehavior processing in connected vehicle networks, according to an embodiment. The system 400 may provide features as described in FIGS. 1 and 2. Components of the system 400 may execute on nodes as described in FIGS. 3A and 3B.

The system 400 includes a public key infrastructure (PKI) 405 (e.g., hosted in a cloud computing network, etc.) that includes a misbehavior authority (MA) 410 communicatively coupled to a linkage authority (LA) 415. A first local area edge network 420 may include a first local MA agent (LMA) 425, vehicles 430 within the area of responsibility of the first LMA 425, a fixed roadside unit (RSU) 435, and a mobile RSU 440. A second local area edge network 445 may include a second LMA 450 that may have responsibility for misbehavior reporting and processing for the second local area edge network 445. While FIG. 4 shows two local area edge networks (e.g., the first local edge network 420 and the second local edge network 445) and two LMAs (e.g., the first LMA 425 and the second LMA 450), it may be understood that there may be many more local area edge networks and LMAs that constitute the whole network.

The first local area edge network 420 and the second local area edge network 445 may each cover a local geographic area and may be regarded as an edge network with its own LMA (e.g., the first LMA 425 and the second LMA 450, respectively) that is responsible for collection and processing of misbehavior reports sent by V2X receivers in its respective coverage area (e.g., including vehicles, RSUs, etc.). Typically, an RSU (e.g., fixed RSU 435, etc.) is deployed in a fixed location as part of the fixed roadside infrastructure. The systems and techniques discussed herein use mobile RSUs (e.g., the mobile RSU 440, etc.) that may be implemented on drones, etc. to provide more flexible information gathering for verification of misbehavior reports, etc. Like the fixed RSU 435, the mobile RSU 440 is equipped with various perception sensors (e.g., a camera, radar, lidar, depth cameras, etc.) and may be deployed as needed to specific locations to accomplish local tasks. For example, if the first LMA 425 needs to collect more independent evidence in order to investigate the validity of a misbehavior report, it may first look for the fixed RSU 435 that is close to the misbehaving vehicle (e.g., one of the vehicles 430, etc.) and may query the fixed RSU 435 to gather more information using the sensors on the fixed RSU 435. If the fixed RSU 435 is not close enough to the misbehaving vehicle, it may deploy the mobile RSU 440 in real time and may use the sensors on the mobile RSU 440 to collect more evidence to assist is verifying or invalidating a misbehavior report. A distributed LMA network as shown in the system 400 has advantages over a conventional centralized MA solution because the LMAs are close to where reports are made and where the subject of the reports are located and may investigate misbehavior matters closer to real time.

The LMAs communicate with the MA 410 in the PM 405 via an LMA-MA interface to inform the MA 410 once it has concluded its processing of certain misbehavior reports and determined that certain vehicles must be revoked. The LMAs may also request the assistance of the LA 415 in the PM 405 to determine if two or more pseudonyms are linked to the same entity. Because vehicle identities are being protected for privacy reasons, only pseudonyms are used to identify the vehicles in the misbehavior reports. When pseudonyms change for a vehicle, the LA 415 in the PKI 405 may link one pseudonym with another, and multiple LAs 415 may work together to link a pseudonym. This may be done either by direct communication between an LMA and the LA 415 (e.g., via LMA-LA link) or may be facilitated via the MA 410 as an intermediary (e.g., as illustrated by a dashed link between the MA 410 and the LA 415 which exists in the PM 405).

Misbehavior reports sent by the vehicles 430 are processed locally by the first LMA 425 and the first LMA 425 may send a summary report with emphasis on the ones that warrant serious consequences for misbehavior. For example, if the first LMA 425 determines that a false misbehavior report is sent, a record is made and the first LMA 425 monitors the reporting vehicle to determine if the vehicle continues to accuse the same or other vehicles of misbehavior. If the vehicle continues to send falsified misbehavior reports, it may be mounting a slandering attack against other vehicles or a Denial of Service (DoS) attack against the first LMA 425. The first LMA 425 may coordinate with the MA 410 to address the suspicious vehicle to obtain further validation, revoke the certificates of the vehicle, provide additional reporting, etc.

Flexibility is provided regarding how big or small of a geographic area each edge may cover. For example, the coverage area may be a coverage area of a local RSU (e.g., the fixed RSU 435, etc.). In another example, the coverage area may cover a campus of a university, a city, etc. Flexibility allows the network of LMAs to be deployed and grown incrementally over time as more and more vehicles become V2X enabled. For example, when V2X penetration rate is low, an LMA may cover a larger geographic area. As the V2X penetration rate increases, the LMA coverage area may shrink while the number of LMAs increases to match the density of V2X enabled vehicles. The coverage area flexibility is like expansion in cellular base stations being deployed over time.

Figure 5A:
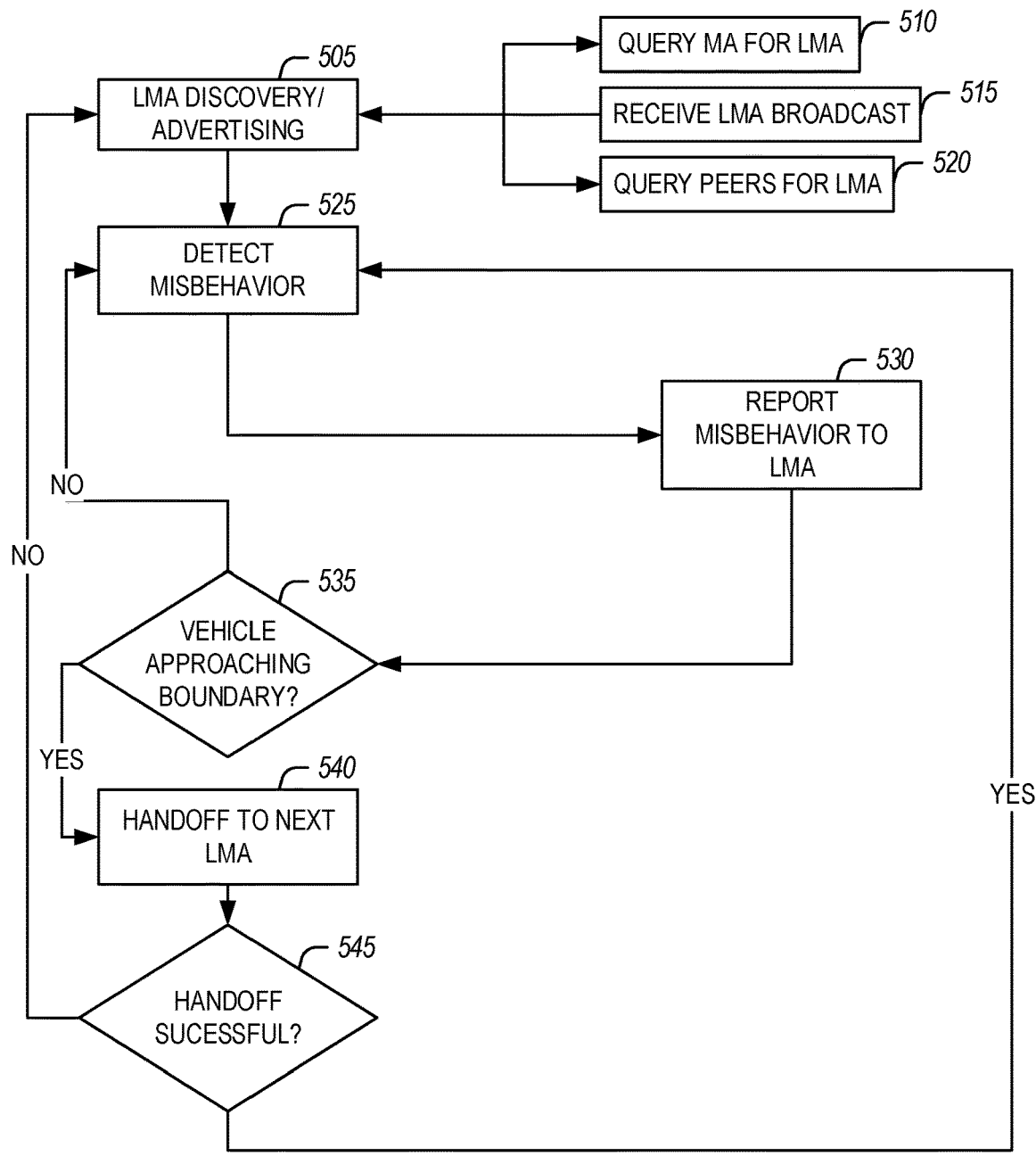
FIG. 5A illustrates an example of a vehicle-to-everything node process for misbehavior processing in connected vehicle networks, according to an embodiment.
Figure 5B:
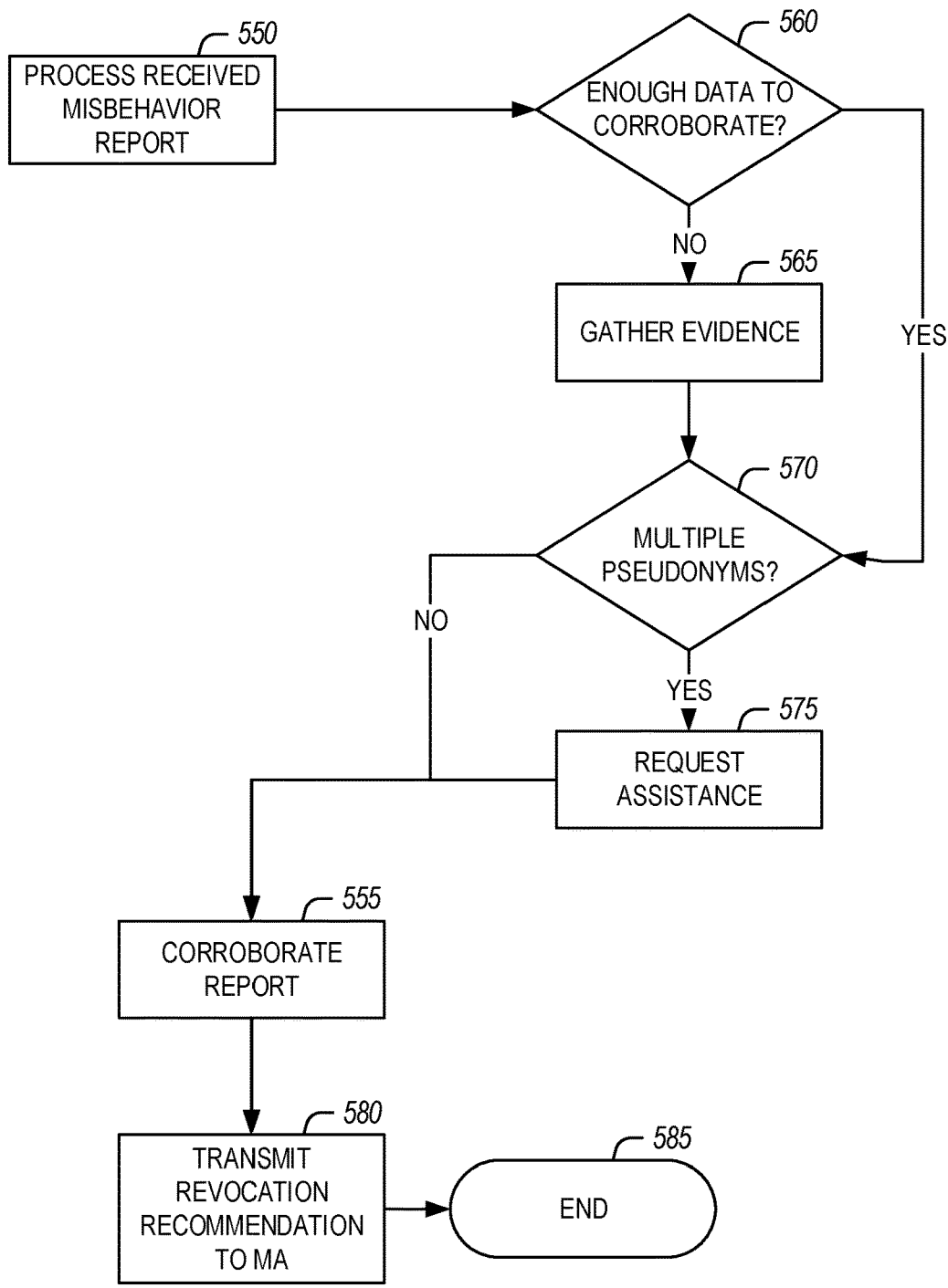
FIG. 5B illustrates an example of a local misbehavior agent process for misbehavior processing in connected vehicle networks, according to an embodiment.

FIGS. 5A and 5B illustrate example processes 500A and 500B for misbehavior processing in connected vehicle networks, according to an embodiment. The processes 500A and 500B may provide features as described in FIG. 4.

FIG. 5A illustrates an example of a vehicle-to-everything (V2X) node process 500A for misbehavior processing in connected vehicle networks, according to an embodiment. The process 500 may provide features as described in FIG. 4.

At operation 505, an LMA (e.g., the first LMA 425, the second LMA 450 as described in FIG. 4, etc.) may be advertised as available for discovery. A V2X node (e.g., a vehicle, etc.) must be able to discover what its corresponding LMA is to send the LMA its misbehavior reports. This is done using several mechanisms. A subset of advertising/discovery mechanisms or all advertising/discovery mechanisms may be used alone or in combination.

At operation 510, the MA may be queried to determine a LMA for a node. A V2X node may send its real time location (and the very near future trajectory if known) to the backend MA and query for the closest LMA. The MA may send one or more appropriate LMAs that are close to the current and future locations of the V2X node.

At operation 515, the V2X node may receive a local broadcast of an LMA. Periodically, LMA info may be broadcast to/by V2X nodes, either in a dedicated message, or more efficiently by tagging that info along within other V2X messages. For example, basic safety messages (BSM) may be extended by adding an optional field for LMAs. This allows for efficient dissemination of identifications of LMAs in an area where a V2X node is located.

At operation 520, the V2X node may query its peers to determine an LMA. A V2X node may broadcast a query for an LMA to its local neighbors (e.g., other V2X nodes, etc.). The neighbors that know the LMA for the area may respond with an answer including an identification of the LMA.

At operation 525, the V2X node may detect misbehavior and may report the misbehavior and to the LMA. Misbehavior detection algorithms are applied to received messages to determine if a message is suspicious.

At operation 530, the V2X may transmit a report of misbehavior to the LMA. The report may include a variety of data including a date and time of the detected misbehavior, a geographical location of the detected misbehavior, details of the detected misbehavior including a type of misbehavior, data elements included in the data received from the misbehaving vehicle, etc.

As the V2X node travels, it may approach and cross local edge network boundaries and/or boundaries of the LMA. Thus, it may be determined if the V2X node is approaching a boundary of the LMA or if the vehicle has entered the boundary of another LMA at decision 535. If so, handover from one LMA to another is completed at operation 545 as the car traverses the boundary of two edge networks. As a car travels, it will traverse different edge networks with different LMAs. It may first notice the new LMA from other peer V2X messages. the car may confirm the new LMA by proactively querying the new LMA from the MA or peers. It is not detrimental if misbehavior reports within one geographic area are sent to a different LMA. The other LMA may forward the report to the correct LMA while informing the reporter that the information was transmitted to the wrong LMA so the reporter will learn to send to the correct LMA. The LMAs may identify other LMA in the federated network or may query MA to find out the identification of an LMA for a geographic area indicated in a report. The LMA-LMA interface may be leveraged for LMAs to collaborate on misbehavior report processing. For example, if a car is being reported as misbehaving in one edge location but it is already traveling outside of the previous edge boundary into another edge, LMA of the previous edge can request support of the LMA in the next edge network for assistance in gathering more evidence. For example, the LMA in the next edge network may send out its mobile RSU on a drone to follow the misbehaving car and the observations maybe shared with the LMA from the previous edge to assist in its final determination of the misbehavior report.

At decision 545, it may be determined if the handoff was successful, if so, the V2X node continues to detect misbehavior at operation 525 and report misbehavior to the new LMA at operation 530. If it is determined, at decision 545, that the handoff was not successful, the V2X node will discover a new LMA at operation 505 using the discovery techniques of operations 510, 515, and 520 and misbehavior detection will continue at operation 525.

FIG. 5B illustrates an example of a local misbehavior agent process 500B for misbehavior processing in connected vehicle networks, according to an embodiment.

At operation 550, the LMA processes a misbehavior report received from the V2X node. The LMA may perform a variety of actions when processing a received misbehavior report. If the misbehavior is present with sufficient and consistent evidence, reported by enough independent observers (e.g., with different pseudonyms) that are close enough to the misbehaving vehicle for direct observation, it may be determined that there is enough data to corroborate the report at decision 560. If so, a revocation recommendation is transmitted to the MA at operation 580 and the process 500B ends at 585.

If it is determined that there is not enough data to corroborate the report at decision 560, the LMA may gather more evidence at operation 565 by requesting more specific evidence from fixed RSU or mobile RSU for an alleged misbehaving vehicle. A mobile RSU that may be implemented on a drone may be deployed and directed to fly over the allegedly misbehaving vehicle and observe and record its behaviors from different angles that are not possible by a fixed RSU. This is an advantage of processing misbehavior reports at the edge locally compared to in the cloud due to shorter end to end latency involved, better scalability, and proximity of the LMA to the suspect vehicle.

The gathered evidence may include multiple pseudonyms. At decision 570, it may be determined if there are multiple pseudonyms present in the misbehavior reports. If so, assistance is requested from a LA at operation 575 if it suspected that multiple pseudonyms are linked to the same entity. The information from the LA is used in linking reports for a misbehaving V2X node that may use multiple pseudonyms as it travels through the network. This allows the LMA to identify data that may be used to corroborate a report at operation 555 even if reports have been made under multiple pseudonyms. The additional evidence gathered at operation 565 may be used to corroborate the report at operation 555.

When additional evidence and assistance have been obtained the responsible LMA corroborates the report at operation 555. The LMA may corroborate reports from multiple reporting nodes to confirm that evidence of misbehavior is consistent. If the report is corroborated, a revocation recommendation is transmitted from the LMA to the MA. At decision 580, the LMA may reach the conclusion that the misbehavior as reported has indeed happened and it is serious and persistent enough that the misbehaving vehicle should be reprimanded by being revoked from the PM. The LMA may only recommend revocation and may not carry out the revocation on its own. Hence, the LMA communicates the recommendation to the MA via an LMA-MA interface. Upon receipt of the revocation recommendation, the MA may complete revocation of the relevant certificates. In an example, the MA may review additional evidence to independently verify the revocation recommendation. This may prevent a compromised LMA from independently revoking certificates for otherwise behaving V2X nodes. The process 500B ends at operation 585.

Figure 6:
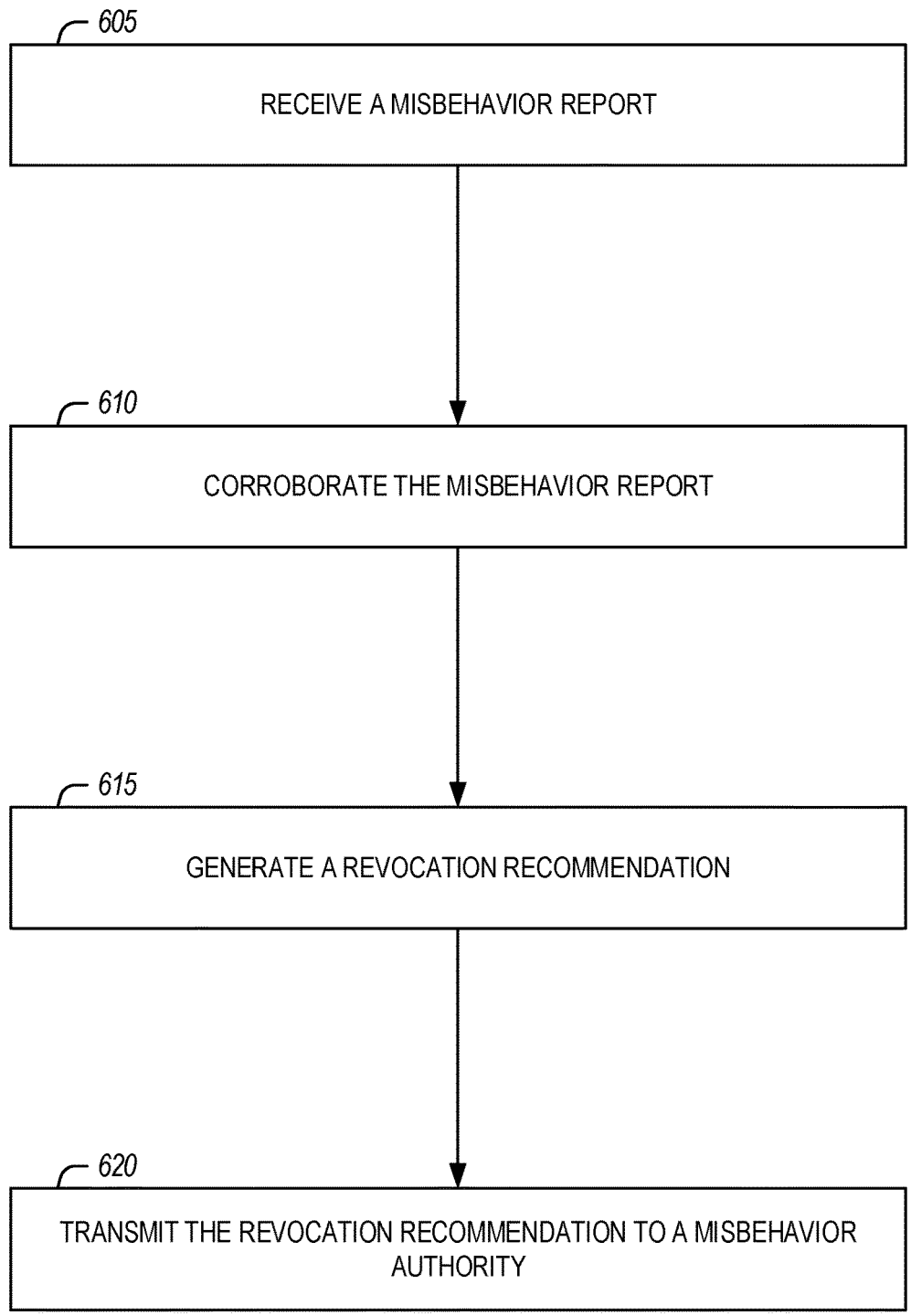
FIG. 6 illustrates an example of a method for processing behavior reports by a local misbehavior agent for misbehavior processing in connected vehicle networks, according to an embodiment.

FIG. 6 illustrates an example of a method 600 for processing behavior reports by a local misbehavior agent for misbehavior processing in connected vehicle networks, according to an embodiment. The method 600 may provide features as described in FIGS. 4 and 5.

At operation 605, a misbehavior report may be received by a local misbehavior agent from a node operating on a vehicle communication network. The local misbehavior agent may be responsible for a geographic area in which the node is located. In an example, a local misbehavior agent identification message may be broadcast on a local area network of the vehicle communication network. A connection request may be received to establish a communication channel with the node. The communication channel may be established using a certificate exchange and the misbehavior report may be received via the communication channel.

At operation 610, the misbehavior report may be corroborated using the misbehavior report and evidence of misbehavior of a subject node of the misbehavior report. In an example, the evidence of misbehavior of the subject node may be obtained from a roadside unit operating in a geographic area where the subject node is transmitting. In an example, sensor measurements of the subject node may be obtained from a fixed roadside unit and the evidence may include the sensor measurements. In another example, a location may be identified where the subject node is operating. A deployment signal may be transmitted to the mobile roadside unit to deploy a mobile roadside unit to the location. Sensor measurements of the subject node may be obtained from the mobile roadside unit and the evidence may include the sensor measurements obtained from the mobile roadside unit.

In an example, similarities may be determined between the misbehavior report and another misbehavior report. It may be identified that the misbehavior report has a first pseudonym for the subject node and the other misbehavior report has a second pseudonym. An assistance request may be transmitted to a linkage authority operating on the vehicle communication network to determine if the first pseudonym and the second pseudonym describe the subject node. A response may be received from the linkage authority and the evidence may include the response from the linkage authority and the other misbehavior report At operation 615, a revocation recommendation may be generated for the subject node based on the corroboration. In an example, the revocation recommendation may include a request to revoke certificates for the subject node. In an example, the evidence may be evaluated to determine that it meets an evidentiary threshold for a misbehavior type indicated in the misbehavior report and the revocation recommendation may be generated based on the determination. At operation 620, the revocation recommendation may be transmitted to a misbehavior authority operating on the vehicle communication network.

In an example, it may be determined that the subject node is approaching a network boundary of the vehicle communication network for the local misbehavior agent. Another local misbehavior agent may be identified on the other side of the network boundary and the misbehavior report and the evidence may be transmitted to the other local misbehavior agent. In an example, a local misbehavior agent identification message that includes a geographic area that the subject node is approaching may be transmitted to a misbehavior authority operating on the vehicle communication network. A response may be received to the local misbehavior agent identification message and the other local misbehavior agent may be identified based on the response. In another example, a local misbehavior agent directory may be queried using the geographic area that the subject node is approaching. A result may be received to the query and the other local misbehavior agent may identified based on the result.

In an example, it may be determined that the subject vehicle is approaching a network boundary of the vehicle communication network for the local misbehavior agent and the misbehavior report and evidence may be received from another local misbehavior agent on the other side of the network boundary. In an example, a local misbehavior agent identification message may be transmitted to the other local misbehavior agent. A secure communication channel may be established with the other local misbehavior agent and the misbehavior report and evidence may be received via the secure communication channel.

In an example, a local misbehavior agent identification message may be broadcast on a local area network of the vehicle communication network. A connection request may be received to establish a communication channel with the node. The communication channel may be stablished using a certificate exchange and the misbehavior report may be received via the communication channel.

Figure 7:
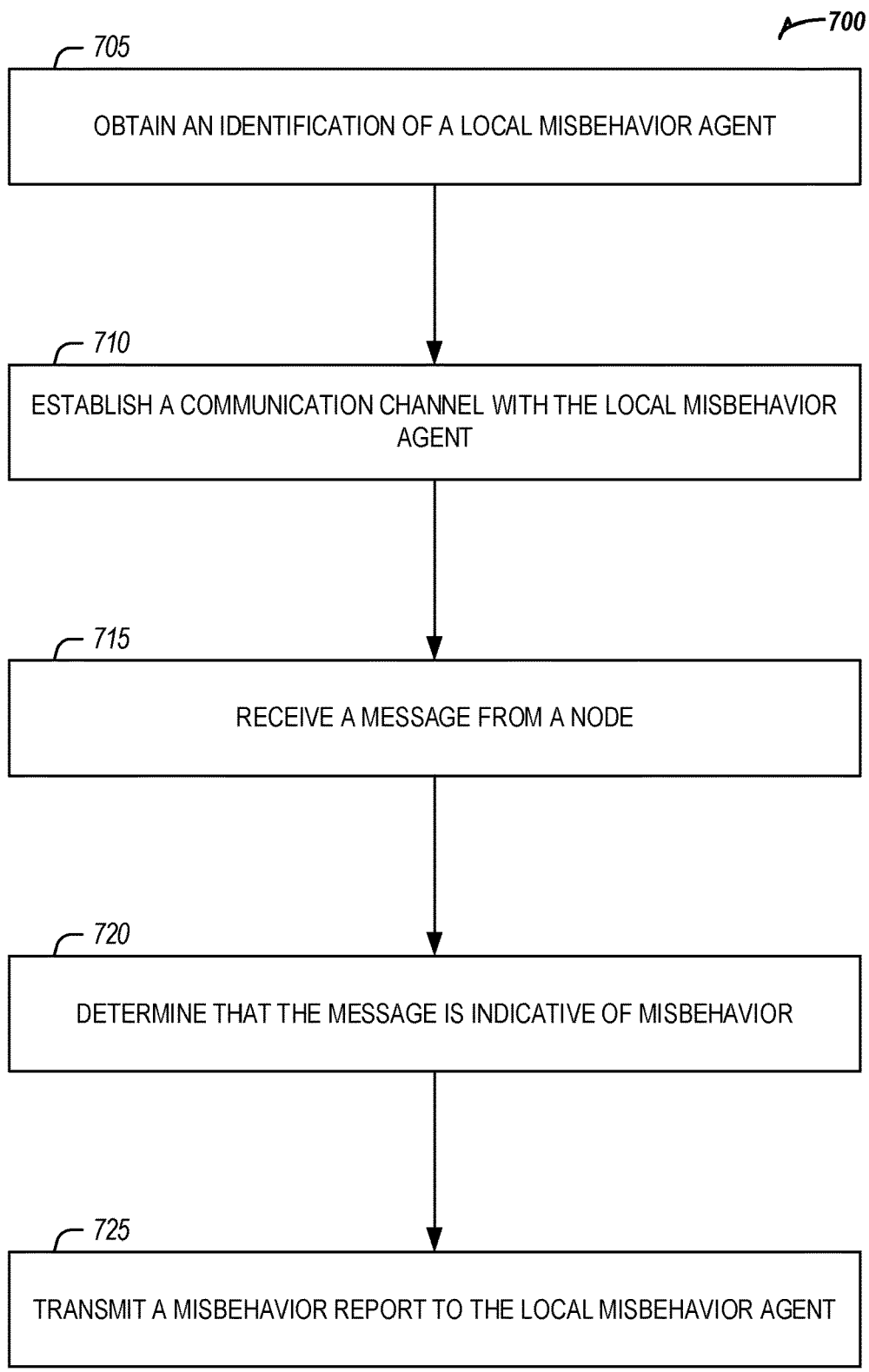
FIG. 7 illustrates an example of a method for reporting misbehavior to a local misbehavior agent by a vehicle-to-everything node for misbehavior processing in connected vehicle networks, according to an embodiment.

FIG. 7 illustrates an example of a method 700 for reporting misbehavior to a local misbehavior agent by a vehicle-to-everything node for misbehavior processing in connected vehicle networks, according to an embodiment. The method 700 may provide features as described in FIGS. 4, 5, and 6.

At operation 705, an identification may be received of a local misbehavior agent for a geographic area operating on a vehicle communication network. In an example, a local misbehavior identification query may be transmitted to a misbehavior authority for the vehicle communication network and the identification of the local misbehavior agent may be obtained in a response from the misbehavior authority. In another example, a local misbehavior identification query may be transmitted to a peer vehicle-to-everything node operating on the vehicle communication network and the identification of the local misbehavior agent may be obtained in a response from the peer vehicle-to-everything node. In yet another example, the identification of the local misbehavior agent may be obtained from a broadcast message received from the local misbehavior agent. In yet another example, a basic safety message may be received via the vehicle communication network and the identification of the local misbehavior agent may be obtained from a block of the basic safety message.

At operation 710, a communication channel may be established with the local misbehavior agent. At operation 715, a message may be received from a node transmitting on the vehicle communication network. At operation 720, it may be determined that the message is indicative of misbehavior. At operation 725, a misbehavior report may be transmitted to the local misbehavior agent.

ADDITIONAL NOTES & EXAMPLES

Example 1 is an apparatus for misbehavior reporting in a vehicle-to-everything communication environment comprising: at least one processor; and memory including instructions that, when executed by the at least one processor, cause the at least one processor to perform operations to: obtain an identification of a local misbehavior agent for a geographic area operating on a vehicle communication network; establish a communication channel with the local misbehavior agent; receive a message from a node transmitting on the vehicle communication network; determine that the message is indicative of misbehavior; and transmit a misbehavior report to the local misbehavior agent.

In Example 2, the subject matter of Example 1 includes, the memory further comprising instructions that, when executed by the at least one processor, cause the at least one processor to perform operations to: transmit a local misbehavior identification query to a misbehavior authority for the vehicle communication network, wherein the identification of the local misbehavior agent is obtained in a response from the misbehavior authority.

In Example 3, the subject matter of Examples 1-2 includes, the memory further comprising instructions that, when executed by the at least one processor, cause the at least one processor to perform operations to: transmit a local misbehavior identification query to a peer vehicle-to-everything node operating on the vehicle communication network, wherein the identification of the local misbehavior agent is obtained in a response from the peer vehicle-to-everything node.

In Example 4, the subject matter of Examples 1-3 includes, the memory further comprising instructions that, when executed by the at least one processor, cause the at least one processor to perform operations to: obtain the identification of the local misbehavior agent from a broadcast message received from the local misbehavior agent.

In Example 5, the subject matter of Examples 1-4 includes, the memory further comprising instructions that, when executed by the at least one processor, cause the at least one processor to perform operations to: receive a basic safety message via the vehicle communication network, wherein the identification of the local misbehavior agent is obtained from a block of the basic safety message.

Example 6 is at least one non-transitory machine-readable medium including instructions for misbehavior reporting in a vehicle-to-everything communication environment that, when executed by at least one processor, cause the at least one processor to perform operations to: obtain an identification of a local misbehavior agent for a geographic area operating on a vehicle communication network; establish a communication channel with the local misbehavior agent; receive a message from a node transmitting on the vehicle communication network; determine that the message is indicative of misbehavior; and transmit a misbehavior report to the local misbehavior agent.

In Example 7, the subject matter of Example 6 includes, instructions that, when executed by the at least one processor, cause the at least one processor to perform operations to: transmit a local misbehavior identification query to a misbehavior authority for the vehicle communication network, wherein the identification of the local misbehavior agent is obtained in a response from the misbehavior authority.

In Example 8, the subject matter of Examples 6-7 includes, instructions that, when executed by the at least one processor, cause the at least one processor to perform operations to: transmit a local misbehavior identification query to a peer vehicle-to-everything node operating on the vehicle communication network, wherein the identification of the local misbehavior agent is obtained in a response from the peer vehicle-to-everything node.

In Example 9, the subject matter of Examples 6-8 includes, instructions that, when executed by the at least one processor, cause the at least one processor to perform operations to: obtain the identification of the local misbehavior agent from a broadcast message received from the local misbehavior agent.

In Example 10, the subject matter of Examples 6-9 includes, instructions that, when executed by the at least one processor, cause the at least one processor to perform operations to: receive a basic safety message via the vehicle communication network, wherein the identification of the local misbehavior agent is obtained from a block of the basic safety message.

Example 11 is a method for misbehavior reporting in a vehicle-to-everything communication environment comprising: obtaining an identification of a local misbehavior agent for a geographic area operating on a vehicle communication network; establishing a communication channel with the local misbehavior agent; receiving a message from a node transmitting on the vehicle communication network; determining that the message is indicative of misbehavior; and transmitting a misbehavior report to the local misbehavior agent.

In Example 12, the subject matter of Example 11 includes, transmitting a local misbehavior identification query to a misbehavior authority for the vehicle communication network, wherein the identification of the local misbehavior agent is obtained in a response from the misbehavior authority.

In Example 13, the subject matter of Examples 11-12 includes, transmitting a local misbehavior identification query to a peer vehicle-to-everything node operating on the vehicle communication network, wherein the identification of the local misbehavior agent is obtained in a response from the peer vehicle-to-everything node.

In Example 14, the subject matter of Examples 11-13 includes, obtaining the identification of the local misbehavior agent from a broadcast message received from the local misbehavior agent.

In Example 15, the subject matter of Examples 11-14 includes, receiving a basic safety message via the vehicle communication network, wherein the identification of the local misbehavior agent is obtained from a block of the basic safety message.

Example 16 is at least one machine-readable medium including instructions that, when executed by a machine, cause the machine to perform any method of Examples 11-15.

Example 17 is a system comprising means to perform any method of Examples 11-15.

Example 18 is a system for misbehavior reporting in a vehicle-to-everything communication environment comprising: means for obtaining an identification of a local misbehavior agent for a geographic area operating on a vehicle communication network; means for establishing a communication channel with the local misbehavior agent; means for receiving a message from a node transmitting on the vehicle communication network; means for determining that the message is indicative of misbehavior; and means for transmitting a misbehavior report to the local misbehavior agent.

In Example 19, the subject matter of Example 18 includes, means for transmitting a local misbehavior identification query to a misbehavior authority for the vehicle communication network, wherein the identification of the local misbehavior agent is obtained in a response from the misbehavior authority.

In Example 20, the subject matter of Examples 18-19 includes, means for transmitting a local misbehavior identification query to a peer vehicle-to-everything node operating on the vehicle communication network, wherein the identification of the local misbehavior agent is obtained in a response from the peer vehicle-to-everything node.

In Example 21, the subject matter of Examples 18-20 includes, means for obtaining the identification of the local misbehavior agent from a broadcast message received from the local misbehavior agent.

In Example 22, the subject matter of Examples 18-21 includes, means for receiving a basic safety message via the vehicle communication network, wherein the identification of the local misbehavior agent is obtained from a block of the basic safety message.

Example 23 is a computing system for misbehavior reporting in a vehicle-to-everything communication environment comprising: at least one processor; and memory including instructions that, when executed by the at least one processor, cause the at least one processor to perform operations to: receive a misbehavior report, at a local misbehavior agent, from a node operating on a vehicle communication network, wherein the local misbehavior agent is responsible for a geographic area in which the node is located; corroborate the misbehavior report using the misbehavior report and evidence of misbehavior of a subject node of the misbehavior report; generate a revocation recommendation for the subject node based on the corroboration; and transmit the revocation recommendation to a misbehavior authority operating on the vehicle communication network.

In Example 24, the subject matter of Example 23 includes, the memory further comprising instructions that, when executed by the at least one processor, cause the at least one processor to perform operations to: obtain the evidence of misbehavior of the subject node from a roadside unit operating in a geographic area where the subject node is transmitting.

In Example 25, the subject matter of Example 24 wherein, the roadside unit is a fixed roadside unit in proximity to the subject node and the memory further comprising instructions that, when executed by the at least one processor, cause the at least one processor to perform operations to: obtain sensor measurements of the subject node from the fixed roadside unit, wherein the evidence includes the sensor measurements.

In Example 26, the subject matter of Examples 24-25 wherein, the roadside unit is a mobile roadside unit and the memory further comprising instructions that, when executed by the at least one processor, cause the at least one processor to perform operations to: identify a location where the subject node is operating; transmit a deployment signal to the mobile roadside unit to deploy the mobile roadside unit to the location; and obtain sensor measurements of the subject node from the mobile roadside unit, wherein the evidence includes the sensor measurements obtained from the mobile roadside unit.

In Example 27, the subject matter of Examples 23-26 includes, the memory further comprising instructions that, when executed by the at least one processor, cause the at least one processor to perform operations to: determine similarities between the misbehavior report and another misbehavior report; identify that the misbehavior report has a first pseudonym for the subject node and the another misbehavior report has a second pseudonym; transmit an assistance request to a linkage authority operating on the vehicle communication network to determine if the first pseudonym and the second pseudonym describe the subject node; and receive a response from the linkage authority, wherein the evidence includes the response from the linkage authority and the another misbehavior report.

In Example 28, the subject matter of Examples 23-27 includes, the memory further comprising instructions that, when executed by the at least one processor, cause the at least one processor to perform operations to: determine that the subject node is approaching a network boundary of the vehicle communication network for the local misbehavior agent; identify another local misbehavior agent, the other local misbehavior agent located across the network boundary; and transmit the misbehavior report and the evidence to the other local misbehavior agent.

In Example 29, the subject matter of Example 28 includes, the memory further comprising instructions that, when executed by the at least one processor, cause the at least one processor to perform operations to: transmit a local misbehavior agent identification message that includes a geographic area that the subject node is approaching to a misbehavior authority operating on the vehicle communication network; and receive a response to the local misbehavior agent identification message, wherein the other local misbehavior agent is identified based on the response.

In Example 30, the subject matter of Examples 28-29 includes, the memory further comprising instructions that, when executed by the at least one processor, cause the at least one processor to perform operations to: query a local misbehavior agent directory using the geographic area that the subject node is approaching; and receive a result to the query, wherein the other local misbehavior agent is identified based on the result.

In Example 31, the subject matter of Examples 23-30 includes, the memory further comprising instructions that, when executed by the at least one processor, cause the at least one processor to perform operations to: determine that the subject vehicle is approaching a network boundary of the vehicle communication network for the local misbehavior agent; and receive the misbehavior report and evidence from another local misbehavior agent, the other local misbehavior agent located across the network boundary.

In Example 32, the subject matter of Example 31 includes, the memory further comprising instructions that, when executed by the at least one processor, cause the at least one processor to perform operations to: transmit a local misbehavior agent identification message to the other local misbehavior agent; and establish a secure communication channel with the other local misbehavior agent, wherein the misbehavior report and evidence are received via the secure communication channel.

In Example 33, the subject matter of Examples 23-32 wherein, the revocation recommendation includes a request to revoke certificates for the subject node.

In Example 34, the subject matter of Examples 23-33 includes, the memory further comprising instructions that, when executed by the at least one processor, cause the at least one processor to perform operations to: broadcast a local misbehavior agent identification message on a local area network of the vehicle communication network; receive a connection request to establish a communication channel with the node; and establish the communication channel using a certificate exchange, wherein the misbehavior report is received via the communication channel.

In Example 35, the subject matter of Examples 23-34 includes, the memory further comprising instructions that, when executed by the at least one processor, cause the at least one processor to perform operations to: evaluate the evidence to determine that it meets an evidentiary threshold for a misbehavior type indicated in the misbehavior report; and generate the revocation recommendation based on the evaluation of the evidence.

Example 36 is at least one non-transitory machine-readable medium including instructions for misbehavior reporting in a vehicle-to-everything communication environment that, when executed by at least one processor, cause the at least one processor to perform operations to: receive a misbehavior report, at a local misbehavior agent, from a node operating on a vehicle communication network, wherein the local misbehavior agent is responsible for a geographic area in which the node is located; corroborate the misbehavior report using the misbehavior report and evidence of misbehavior of a subject node of the misbehavior report; generate a revocation recommendation for the subject node based on the corroboration; and transmit the revocation recommendation to a misbehavior authority operating on the vehicle communication network.

In Example 37, the subject matter of Example 36 includes, instructions that, when executed by the at least one processor, cause the at least one processor to perform operations to: obtain the evidence of misbehavior of the subject node from a roadside unit operating in a geographic area where the subject node is transmitting.

In Example 38, the subject matter of Example 37 wherein, the roadside unit is a fixed roadside unit in proximity to the subject node and further comprising instructions that, when executed by the at least one processor, cause the at least one processor to perform operations to: obtain sensor measurements of the subject node from the fixed roadside unit, wherein the evidence includes the sensor measurements.

In Example 39, the subject matter of Examples 37-38 wherein, the roadside unit is a mobile roadside unit and further comprising instructions that, when executed by the at least one processor, cause the at least one processor to perform operations to: identify a location where the subject node is operating; transmit a deployment signal to the mobile roadside unit to deploy the mobile roadside unit to the location; and obtain sensor measurements of the subject node from the mobile roadside unit, wherein the evidence includes the sensor measurements obtained from the mobile roadside unit.

In Example 40, the subject matter of Examples 36-39 includes, instructions that, when executed by the at least one processor, cause the at least one processor to perform operations to: determine similarities between the misbehavior report and another misbehavior report; identify that the misbehavior report has a first pseudonym for the subject node and the another misbehavior report has a second pseudonym; transmit an assistance request to a linkage authority operating on the vehicle communication network to determine if the first pseudonym and the second pseudonym describe the subject node; and receive a response from the linkage authority, wherein the evidence includes the response from the linkage authority and the another misbehavior report.

In Example 41, the subject matter of Examples 36-40 includes, instructions that, when executed by the at least one processor, cause the at least one processor to perform operations to: determine that the subject node is approaching a network boundary of the vehicle communication network for the local misbehavior agent; identify another local misbehavior agent, the other local misbehavior agent located across the network boundary; and transmit the misbehavior report and the evidence to the other local misbehavior agent.

In Example 42, the subject matter of Example 41 includes, instructions that, when executed by the at least one processor, cause the at least one processor to perform operations to: transmit a local misbehavior agent identification message that includes a geographic area that the subject node is approaching to a misbehavior authority operating on the vehicle communication network; and receive a response to the local misbehavior agent identification message, wherein the other local misbehavior agent is identified based on the response.

In Example 43, the subject matter of Examples 41-42 includes, instructions that, when executed by the at least one processor, cause the at least one processor to perform operations to: query a local misbehavior agent directory using the geographic area that the subject node is approaching; and receive a result to the query, wherein the other local misbehavior agent is identified based on the result.

In Example 44, the subject matter of Examples 36-43 includes, instructions that, when executed by the at least one processor, cause the at least one processor to perform operations to: determine that the subject vehicle is approaching a network boundary of the vehicle communication network for the local misbehavior agent; and receive the misbehavior report and evidence from another local misbehavior agent, the other local misbehavior agent located across the network boundary.

In Example 45, the subject matter of Example 44 includes, instructions that, when executed by the at least one processor, cause the at least one processor to perform operations to: transmit a local misbehavior agent identification message to the other local misbehavior agent; and establish a secure communication channel with the other local misbehavior agent, wherein the misbehavior report and evidence are received via the secure communication channel.

In Example 46, the subject matter of Examples 36-45 wherein, the revocation recommendation includes a request to revoke certificates for the subject node.

In Example 47, the subject matter of Examples 36-46 includes, instructions that, when executed by the at least one processor, cause the at least one processor to perform operations to: broadcast a local misbehavior agent identification message on a local area network of the vehicle communication network; receive a connection request to establish a communication channel with the node; and establish the communication channel using a certificate exchange, wherein the misbehavior report is received via the communication channel.

In Example 48, the subject matter of Examples 36-47 includes, instructions that, when executed by the at least one processor, cause the at least one processor to perform operations to: evaluate the evidence to determine that it meets an evidentiary threshold for a misbehavior type indicated in the misbehavior report; and generate the revocation recommendation based on the evaluation of the evidence.

Example 49 is a method for misbehavior reporting in a vehicle-to-everything communication environment comprising: receiving a misbehavior report, at a local misbehavior agent, from a node operating on a vehicle communication network, wherein the local misbehavior agent is responsible for a geographic area in which the node is located; corroborating the misbehavior report using the misbehavior report and evidence of misbehavior of a subject node of the misbehavior report; generating a revocation recommendation for the subject node based on the corroboration; and transmitting the revocation recommendation to a misbehavior authority operating on the vehicle communication network.

In Example 50, the subject matter of Example 49 includes, obtaining the evidence of misbehavior of the subject node from a roadside unit operating in a geographic area where the subject node is transmitting.

In Example 51, the subject matter of Example 50 wherein, the roadside unit is a fixed roadside unit in proximity to the subject node and further comprising: obtaining sensor measurements of the subject node from the fixed roadside unit, wherein the evidence includes the sensor measurements.

In Example 52, the subject matter of Examples 50-51 wherein, the roadside unit is a mobile roadside unit and further comprising: identifying a location where the subject node is operating; transmitting a deployment signal to the mobile roadside unit to deploy the mobile roadside unit to the location; and obtaining sensor measurements of the subject node from the mobile roadside unit, wherein the evidence includes the sensor measurements obtained from the mobile roadside unit.

In Example 53, the subject matter of Examples 49-52 includes, determining similarities between the misbehavior report and another misbehavior report; identifying that the misbehavior report has a first pseudonym for the subject node and the another misbehavior report has a second pseudonym; transmitting an assistance request to a linkage authority operating on the vehicle communication network to determine if the first pseudonym and the second pseudonym describe the subject node; and receiving a response from the linkage authority, wherein the evidence includes the response from the linkage authority and the another misbehavior report.

In Example 54, the subject matter of Examples 49-53 includes, determining that the subject node is approaching a network boundary of the vehicle communication network for the local misbehavior agent; identifying another local misbehavior agent, the other local misbehavior agent located across the network boundary; and transmitting the misbehavior report and the evidence to the other local misbehavior agent.

In Example 55, the subject matter of Example 54 includes, transmitting a local misbehavior agent identification message that includes a geographic area that the subject node is approaching to a misbehavior authority operating on the vehicle communication network; and receiving a response to the local misbehavior agent identification message, wherein the other local misbehavior agent is identified based on the response.

In Example 56, the subject matter of Examples 54-55 includes, querying a local misbehavior agent directory using the geographic area that the subject node is approaching; and receiving a result to the query, wherein the other local misbehavior agent is identified based on the result.

In Example 57, the subject matter of Examples 49-56 includes, determining that the subject vehicle is approaching a network boundary of the vehicle communication network for the local misbehavior agent; and receiving the misbehavior report and evidence from another local misbehavior agent, the other local misbehavior agent located across the network boundary.

In Example 58, the subject matter of Example 57 includes, transmitting a local misbehavior agent identification message to the other local misbehavior agent; and establishing a secure communication channel with the other local misbehavior agent, wherein the misbehavior report and evidence are received via the secure communication channel.

In Example 59, the subject matter of Examples 49-58 wherein, the revocation recommendation includes a request to revoke certificates for the subject node.

In Example 60, the subject matter of Examples 49-59 includes, broadcasting a local misbehavior agent identification message on a local area network of the vehicle communication network; receiving a connection request to establish a communication channel with the node; and establishing the communication channel using a certificate exchange, wherein the misbehavior report is received via the communication channel.

In Example 61, the subject matter of Examples 49-60 includes, evaluating the evidence to determine that it meets an evidentiary threshold for a misbehavior type indicated in the misbehavior report; and generating the revocation recommendation based on the evaluation of the evidence.

Example 62 is at least one machine-readable medium including instructions that, when executed by a machine, cause the machine to perform any method of Examples M1-M13.

Example 63 is a system comprising means to perform any method of Examples M1-M13.

Example 64 is a system for misbehavior reporting in a vehicle-to-everything communication environment comprising: means for receiving a misbehavior report, at a local misbehavior agent, from a node operating on a vehicle communication network, wherein the local misbehavior agent is responsible for a geographic area in which the node is located; means for corroborating the misbehavior report using the misbehavior report and evidence of misbehavior of a subject node of the misbehavior report; means for generating a revocation recommendation for the subject node based on the corroboration; and means for transmitting the revocation recommendation to a misbehavior authority operating on the vehicle communication network.

In Example 65, the subject matter of Example 64 includes, means for obtaining the evidence of misbehavior of the subject node from a roadside unit operating in a geographic area where the subject node is transmitting.

In Example 66, the subject matter of Example 65 wherein, the roadside unit is a fixed roadside unit in proximity to the subject node and further comprising: means for obtaining sensor measurements of the subject node from the fixed roadside unit, wherein the evidence includes the sensor measurements.

In Example 67, the subject matter of Examples 65-66 wherein, the roadside unit is a mobile roadside unit and further comprising: means for identifying a location where the subject node is operating; means for transmitting a deployment signal to the mobile roadside unit to deploy the mobile roadside unit to the location; and means for obtaining sensor measurements of the subject node from the mobile roadside unit, wherein the evidence includes the sensor measurements obtained from the mobile roadside unit.

In Example 68, the subject matter of Examples 64-67 includes, means for determining similarities between the misbehavior report and another misbehavior report; means for identifying that the misbehavior report has a first pseudonym for the subject node and the another misbehavior report has a second pseudonym; means for transmitting an assistance request to a linkage authority operating on the vehicle communication network to determine if the first pseudonym and the second pseudonym describe the subject node; and means for receiving a response from the linkage authority, wherein the evidence includes the response from the linkage authority and the another misbehavior report.

In Example 69, the subject matter of Examples 64-68 includes, means for determining that the subject node is approaching a network boundary of the vehicle communication network for the local misbehavior agent; means for identifying another local misbehavior agent, the other local misbehavior agent located across the network boundary; and means for transmitting the misbehavior report and the evidence to the other local misbehavior agent.

In Example 70, the subject matter of Example 69 includes, means for transmitting a local misbehavior agent identification message that includes a geographic area that the subject node is approaching to a misbehavior authority operating on the vehicle communication network; and means for receiving a response to the local misbehavior agent identification message, wherein the other local misbehavior agent is identified based on the response.

In Example 71, the subject matter of Examples 69-70 includes, means for querying a local misbehavior agent directory using the geographic area that the subject node is approaching; and means for receiving a result to the query, wherein the other local misbehavior agent is identified based on the result.

In Example 72, the subject matter of Examples 64-71 includes, means for determining that the subject vehicle is approaching a network boundary of the vehicle communication network for the local misbehavior agent; and means for receiving the misbehavior report and evidence from another local misbehavior agent, the other local misbehavior agent located across the network boundary.

In Example 73, the subject matter of Example 72 includes, means for transmitting a local misbehavior agent identification message to the other local misbehavior agent; and means for establishing a secure communication channel with the other local misbehavior agent, wherein the misbehavior report and evidence are received via the secure communication channel.

In Example 74, the subject matter of Examples 64-73 wherein, the revocation recommendation includes a request to revoke certificates for the subject node.

In Example 75, the subject matter of Examples 64-74 includes, means for broadcasting a local misbehavior agent identification message on a local area network of the vehicle communication network; means for receiving a connection request to establish a communication channel with the node; and means for establishing the communication channel using a certificate exchange, wherein the misbehavior report is received via the communication channel.

In Example 76, the subject matter of Examples 64-75 includes, means for evaluating the evidence to determine that it meets an evidentiary threshold for a misbehavior type indicated in the misbehavior report; and means for generating the revocation recommendation based on the evaluation of the evidence.

Example 77 is a computing system for misbehavior reporting in a vehicle-to-everything communication environment comprising: at least one processor; and memory including instructions that, when executed by the at least one processor, cause the at least one processor to perform operations to: receive a misbehavior report from a node operating on a vehicle communication network; corroborate the misbehavior report using the misbehavior report and evidence of misbehavior of a subject node of the misbehavior report; generate a revocation recommendation for the subject node based on the corroboration; and transmit the revocation recommendation to a misbehavior authority operating on the vehicle communication network.

In Example 78, the subject matter of Example 77 wherein, the misbehavior report is received at a local misbehavior agent that is responsible for a geographic area in which the node is located.

In Example 79, the subject matter of Examples 77-78 wherein, the misbehavior report includes misbehavior data collected by the node based on a detected misbehavior of another node operating on the vehicle communication network.

In Example 80, the subject matter of Examples 77-79 includes, the memory further comprising instructions that, when executed by the at least one processor, cause the at least one processor to perform operations to: gather the evidence of the misbehavior from another node operating on the vehicle communication network.

In Example 81, the subject matter of Examples 77-80 wherein, the local misbehavior agent operates in a local area edge network of the vehicle communication network.

In Example 82, the subject matter of Examples 77-81 wherein, the misbehavior authority operates in a core network of the vehicle communication network.

In Example 83, the subject matter of Examples 77-82 includes, the memory further comprising instructions that, when executed by the at least one processor, cause the at least one processor to perform operations to: receive a revocation directive from the misbehavior authority; and prevent transmission of messages from the suspect node.

Example 84 is at least one non-transitory machine-readable medium including instructions for misbehavior reporting in a vehicle-to-everything communication environment that, when executed by at least one processor, cause the at least one processor to perform operations to: receive a misbehavior report from a node operating on a vehicle communication network; corroborate the misbehavior report using the misbehavior report and evidence of misbehavior of a subject node of the misbehavior report; generate a revocation recommendation for the subject node based on the corroboration; and transmit the revocation recommendation to a misbehavior authority operating on the vehicle communication network.

In Example 85, the subject matter of Example 84 wherein, the misbehavior report is received at a local misbehavior agent that is responsible for a geographic area in which the node is located.

In Example 86, the subject matter of Examples 84-85 wherein, the misbehavior report includes misbehavior data collected by the node based on a detected misbehavior of another node operating on the vehicle communication network.

In Example 87, the subject matter of Examples 84-86 includes, instructions that, when executed by the at least one processor, cause the at least one processor to perform operations to: gather the evidence of the misbehavior from another node operating on the vehicle communication network.

In Example 88, the subject matter of Examples 84-87 wherein, the local misbehavior agent operates in a local area edge network of the vehicle communication network.

In Example 89, the subject matter of Examples 84-88 wherein, the misbehavior authority operates in a core network of the vehicle communication network.

In Example 90, the subject matter of Examples 84-89 includes, instructions that, when executed by the at least one processor, cause the at least one processor to perform operations to: receive a revocation directive from the misbehavior authority; and prevent transmission of messages from the suspect node.

Example 91 is a method for misbehavior reporting in a vehicle-to-everything communication environment comprising: receiving a misbehavior report from a node operating on a vehicle communication network; corroborating the misbehavior report using the misbehavior report and evidence of misbehavior of a subject node of the misbehavior report; generating a revocation recommendation for the subject node based on the corroboration; and transmitting the revocation recommendation to a misbehavior authority operating on the vehicle communication network.

In Example 92, the subject matter of Example 91 wherein, the misbehavior report is received at a local misbehavior agent that is responsible for a geographic area in which the node is located.

In Example 93, the subject matter of Examples 91-92 wherein, the misbehavior report includes misbehavior data collected by the node based on a detected misbehavior of another node operating on the vehicle communication network.

In Example 94, the subject matter of Examples 91-93 includes, gathering the evidence of the misbehavior from another node operating on the vehicle communication network.

In Example 95, the subject matter of Examples 91-94 wherein, the local misbehavior agent operates in a local area edge network of the vehicle communication network.

In Example 96, the subject matter of Examples 91-95 wherein, the misbehavior authority operates in a core network of the vehicle communication network.

In Example 97, the subject matter of Examples 91-96 includes, receiving a revocation directive from the misbehavior authority; and preventing transmission of messages from the suspect node.

Example 98 is at least one machine-readable medium including instructions that, when executed by a machine, cause the machine to perform any method of Examples 91-97.

Example 99 is a system comprising means to perform any method of Examples 91-97.

Example 100 is a system for misbehavior reporting in a vehicle-to-everything communication environment comprising: means for receiving a misbehavior report from a node operating on a vehicle communication network; means for corroborating the misbehavior report using the misbehavior report and evidence of misbehavior of a subject node of the misbehavior report; means for generating a revocation recommendation for the subject node based on the corroboration; and means for transmitting the revocation recommendation to a misbehavior authority operating on the vehicle communication network.

In Example 101, the subject matter of Example 100 wherein, the misbehavior report is received at a local misbehavior agent that is responsible for a geographic area in which the node is located.

In Example 102, the subject matter of Examples 100-101 wherein, the misbehavior report includes misbehavior data collected by the node based on a detected misbehavior of another node operating on the vehicle communication network.

In Example 103, the subject matter of Examples 100-102 includes, means for gathering the evidence of the misbehavior from another node operating on the vehicle communication network.

In Example 104, the subject matter of Examples 100-103 wherein, the local misbehavior agent operates in a local area edge network of the vehicle communication network.

In Example 105, the subject matter of Examples 100-104 wherein, the misbehavior authority operates in a core network of the vehicle communication network.

In Example 106, the subject matter of Examples 100-105 includes, means for receiving a revocation directive from the misbehavior authority; and means for preventing transmission of messages from the suspect node.

Example 107 is at least one machine-readable medium including instructions that, when executed by processing circuitry, cause the processing circuitry to perform operations to implement of any of Examples 1-106.

Example 108 is an apparatus comprising means to implement of any of Examples 1-106.

Example 109 is a system to implement of any of Examples 1-106.

Example 110 is a method to implement of any of Examples 1-106.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory machine-readable medium including instructions for misbehavior reporting in a vehicle-to-everything communication environment that, when executed by at least one processor, cause the at least one processor to perform operations to:
   receive a misbehavior report, at a local misbehavior agent, from a node operating on a vehicle communication network, wherein the local misbehavior agent is responsible for a geographic area in which the node is located;
   determine similarities between the misbehavior report and another misbehavior report;
   identify that the misbehavior report has a first pseudonym for a subject node and the another misbehavior report has a second pseudonym;
   transmit an assistance request to a linkage authority operating on the vehicle communication network to determine if the first pseudonym and the second pseudonym describe the subject node;
   receive a response from the linkage authority comprising evidence of misbehavior of the subject node, wherein the evidence of misbehavior of the subject node comprises the response from the linkage authority and the another misbehavior report;
   corroborate the misbehavior report using the evidence of misbehavior of the subject node;
   generate a revocation recommendation for the subject node based on the corroboration; and
   transmit the revocation recommendation to a misbehavior authority operating on the vehicle communication network.

2. The at least one non-transitory machine-readable medium of claim 1, further comprising instructions that, when executed by the at least one processor, cause the at least one processor to perform operations to:
   obtain the evidence of misbehavior of the subject node from a roadside unit operating in a geographic area where the subject node is transmitting.

3. The at least one non-transitory machine-readable medium of claim 2, wherein the roadside unit is a fixed roadside unit in proximity to the subject node and further comprising instructions that, when executed by the at least one processor, cause the at least one processor to perform operations to:
   obtain sensor measurements of the subject node from the fixed roadside unit, wherein the evidence includes the sensor measurements.

4. The at least one non-transitory machine-readable medium of claim 2, wherein the roadside unit is a mobile roadside unit and further comprising instructions that, when executed by the at least one processor, cause the at least one processor to perform operations to:
   identify a location where the subject node is operating;
   transmit a deployment signal to the mobile roadside unit to deploy the mobile roadside unit to the location; and obtain sensor measurements of the subject node from the mobile roadside unit, wherein the evidence includes the sensor measurements obtained from the mobile roadside unit.

5. The at least one non-transitory machine-readable medium of claim 1, further comprising instructions that, when executed by the at least one processor, cause the at least one processor to perform operations to:
determine that the subject node is approaching a network boundary of the vehicle communication network for the local misbehavior agent;
identify another local misbehavior agent, the another local misbehavior agent located across the network boundary; and
transmit the misbehavior report and the evidence to the another local misbehavior agent.

6. The at least one non-transitory machine-readable medium of claim 5, further comprising instructions that, when executed by the at least one processor, cause the at least one processor to perform operations to:
transmit a local misbehavior agent identification message that includes a destination geographic area that the subject node is approaching to the misbehavior authority operating on the vehicle communication network; and
receive a response to the local misbehavior agent identification message, wherein the another local misbehavior agent is identified based on the response.

7. The at least one non-transitory machine-readable medium of claim 5, further comprising instructions that, when executed by the at least one processor, cause the at least one processor to perform operations to:
query a local misbehavior agent directory using a geographic area that the subject node is approaching; and
receive a result to the query, wherein the another local misbehavior agent is identified based on the result.

8. The at least one non-transitory machine-readable medium of claim 1, further comprising instructions that, when executed by the at least one processor, cause the at least one processor to perform operations to:
determine that the subject node is approaching a network boundary of the vehicle communication network for the local misbehavior agent; and
receive the misbehavior report and supplemental evidence from another local misbehavior agent, the another local misbehavior agent located across the network boundary.

9. The at least one non-transitory machine-readable medium of claim 8, further comprising instructions that, when executed by the at least one processor, cause the at least one processor to perform operations to:
transmit a local misbehavior agent identification message to the another local misbehavior agent; and
establish a secure communication channel with the another local misbehavior agent, wherein the misbehavior report and the supplemental evidence are received via the secure communication channel.

10. The at least one non-transitory machine-readable medium of claim 1, wherein the revocation recommendation includes a request to revoke certificates for the subject node.

11. The at least one non-transitory machine-readable medium of claim 1, further comprising instructions that, when executed by the at least one processor, cause the at least one processor to perform operations to:
broadcast a local misbehavior agent identification message on a local area network of the vehicle communication network;
receive a connection request to establish a communication channel with the node; and
establish the communication channel using a certificate exchange, wherein the misbehavior report is received via the communication channel.

12. The at least one non-transitory machine-readable medium of claim 1, further comprising instructions that, when executed by the at least one processor, cause the at least one processor to perform operations to:
evaluate the evidence to determine that it meets an evidentiary threshold for a misbehavior type indicated in the misbehavior report; and
generate the revocation recommendation based on the evaluation of the evidence.

13. A computing system for misbehavior reporting in a vehicle-to-everything communication environment comprising:
at least one processor; and
memory including instructions that, when executed by the at least one processor, cause the at least one processor to perform operations to:
receive a misbehavior report from a node operating on a vehicle communication network, wherein the misbehavior report is received at a local misbehavior agent that is responsible for a geographic area in which the node is located;
determine similarities between the misbehavior report and another misbehavior report;
identify that the misbehavior report has a first pseudonym for a subject node and the another misbehavior report has a second pseudonym;
transmit an assistance request to a linkage authority operating on the vehicle communication network to determine if the first pseudonym and the second pseudonym describe the subject node;
receive a response from the linkage authority comprising evidence of misbehavior of the subject node, wherein the evidence of misbehavior of the subject node comprises the response from the linkage authority and the another misbehavior report;
corroborate the misbehavior report using the evidence of misbehavior of the subject node;
generate a revocation recommendation for the subject node based on the corroboration; and
transmit the revocation recommendation to a misbehavior authority operating on the vehicle communication network.

14. The computing system of claim 13, wherein the misbehavior report includes misbehavior data collected by the node based on a detected misbehavior of another node operating on the vehicle communication network.

15. The computing system of claim 13, the memory further comprising instructions that, when executed by the at least one processor, cause the at least one processor to perform operations to:
gather the evidence of the misbehavior from another node operating on the vehicle communication network.

16. The computing system of claim 13, wherein the local misbehavior agent operates in a local area edge network of the vehicle communication network.

17. The computing system of claim 13, wherein the misbehavior authority operates in a core network of the vehicle communication network.

18. The computing system of claim 13, the memory further comprising instructions that, when executed by the at least one processor, cause the at least one processor to perform operations to:

receive a revocation directive from the misbehavior authority; and prevent transmission of messages from the subject node.

19. The computing system of claim 13, wherein sensor measurements of the subject node are obtained from a fixed roadside unit in proximity to the subject node, and wherein the evidence includes the sensor measurements.

\* \* \* \* \*